United States Patent
Abe et al.

(10) Patent No.: US 12,052,436 B2
(45) Date of Patent: *Jul. 30, 2024

(54) ENCODER AND DECODER FOR DERIVING THE MOTION VECTOR OF THE CURRENT BLOCK AND PERFORMING MOTION COMPENSATION

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP); Takashi Hashimoto, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,173

(22) Filed: May 2, 2023

(65) Prior Publication Data

US 2023/0276068 A1    Aug. 31, 2023

Related U.S. Application Data

(63) Continuation of application No. 17/895,189, filed on Aug. 25, 2022, now Pat. No. 11,677,975, which is a
(Continued)

(51) Int. Cl.
*H04N 19/52* (2014.01)
*H04N 19/124* (2014.01)
(Continued)

(52) U.S. Cl.
CPC ........... *H04N 19/52* (2014.11); *H04N 19/124* (2014.11); *H04N 19/159* (2014.11); *H04N 19/176* (2014.11)

(58) Field of Classification Search
CPC .... H04N 19/52; H04N 19/124; H04N 19/159; H04N 19/176; H04N 19/533;
(Continued)

(56) References Cited

U.S. PATENT DOCUMENTS 10,015,514 B2    7/2018    Fukushima
10,863,189 B2 *  12/2020   Wennersten ......... H04N 19/184
(Continued)

FOREIGN PATENT DOCUMENTS

JP    8-163570    6/1996
JP    2008-5545   1/2008
(Continued)

OTHER PUBLICATIONS

International Search Report (ISR) issued on Nov. 20, 2018 in International (PCT) Application No. PCT/JP2018/034793.
(Continued)

*Primary Examiner* — Susan E. Torgerson
(74) *Attorney, Agent, or Firm* — Wenderoth, Lind & Ponack, L.L.P.

(57) ABSTRACT

An encoder includes circuitry and memory. Using the memory, the circuitry, in inter prediction processing: derives a first motion vector of a current block to be processed, using a motion vector of a previous block which has been previously processed; derives a second motion vector of the current block by performing motion estimation in the vicinity of the first motion vector; and generates a prediction image of the current block by performing motion compensation using the second motion vector.

2 Claims, 33 Drawing Sheets

Related U.S. Application Data continuation of application No. 17/342,076, filed on Jun. 8, 2021, now Pat. No. 11,463,724, which is a continuation of application No. 16/794,944, filed on Feb. 19, 2020, now Pat. No. 11,064,216, which is a continuation of application No. PCT/JP2018/034793, filed on Sep. 20, 2018.

(60) Provisional application No. 62/563,235, filed on Sep. 26, 2017.

(51) Int. Cl.
  *H04N 19/159* (2014.01)
  *H04N 19/176* (2014.01)

(58) Field of Classification Search
  CPC .... H04N 19/436; H04N 19/53; H04N 19/105; H04N 19/109; H04N 19/146; H04N 19/156; H04N 19/167
  USPC ........................................................ 375/240
  See application file for complete search history.

(56) References Cited

U.S. PATENT DOCUMENTS

| | | |
|---|---|---|
| 2002/0114388 A1 | 8/2002 | Ueda et al. |
| 2009/0092326 A1 | 4/2009 | Fukuhara et al. |
| 2013/0272404 A1 | 10/2013 | Park |
| 2016/0286230 A1 | 9/2016 | Li et al. |
| 2016/0295225 A1 | 10/2016 | Takano |
| 2017/0238005 A1 | 8/2017 | Chien |
| 2019/0082192 A1 | 3/2019 | Chuang |
| 2019/0215530 A1 | 7/2019 | Bici |

FOREIGN PATENT DOCUMENTS

| | | |
|---|---|---|
| JP | 2011-172243 | 9/2011 |
| JP | 2016-192793 | 11/2016 |
| WO | 2007/066710 | 6/2007 |
| WO | 2015/083300 | 6/2015 |
| WO | 2017/157281 | 9/2017 |

OTHER PUBLICATIONS

Jianle Chen, et al., "Algorithm Description of Joint Exploration Test Model 7 (JEM7)", Joint Video Exploration Team (JVET) of ITU-T SG 16 WP 3 and ISO/IEC JTC 1/SC 29/WG 11, Document: JVET-G1001-v1, Jul. 2017, pp. 20-28.
Extended European Search Report issued Jul. 20, 2020 in corresponding European Patent Application No. 18862113.0.
Chen et al., "Further improvements to HMKTA-1.0", ITU—Telecommunications Standardization Sector, Video Coding Experts Group (VCEG), 52$^{nd}$ Meeting, Warsaw, Poland, Jun. 2015.
Chen et al., "Algorithm Description of Joint Exploration Test Model 7 (JEM7)", Joint Video Exploration Team (JVET) of ITU-T SG 16 WP 3 and ISO/IEC JTC 1/SC 29/WG 11, 7th Meeting: Torino, IT, Jul. 2017.
H.265 (ISO/IEC 23008-2 High efficiency video coding (HEVC)), Dec. 1, 2013, Section 8.5.3.2, pp. 113-128.
Communication to pursuant to Article 94(3) EPC issued Feb. 2, 2023 in European Patent Application No. 18862113.0.
Xiaoyu Xiu et al., "CE9-related: Addressing the decoding latency issue for decoder-side motion vector refinement (DMVR)", Joint Video Experts Team (JVET) of ITU-T SG16 WP3 and ISO/IEC JTC1/SC29/WG11, 11th Meeting: Ljubljana, SI, Jul. 10-18, 2018, Document: JVET-K0347-v2, , pp. 1-5, XP030199761A.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$<br>WHERE $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$<br>WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

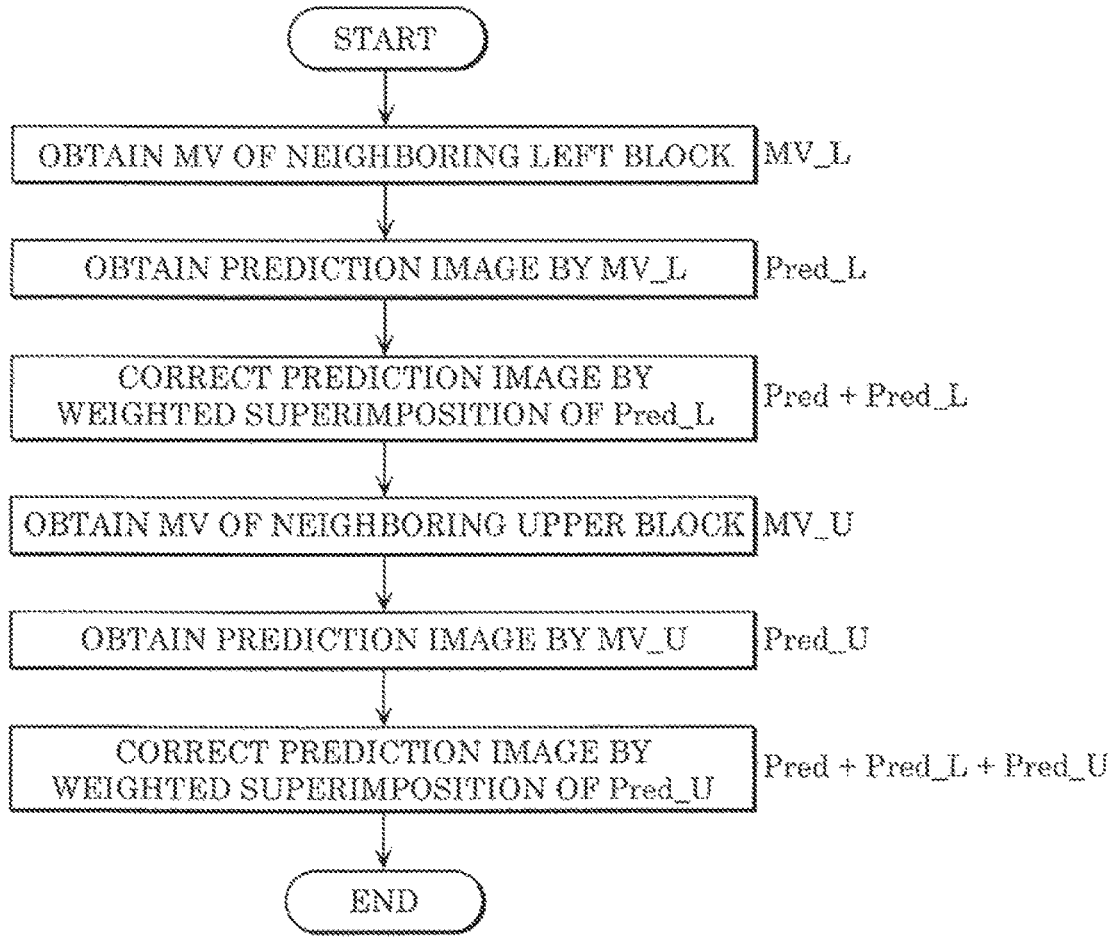
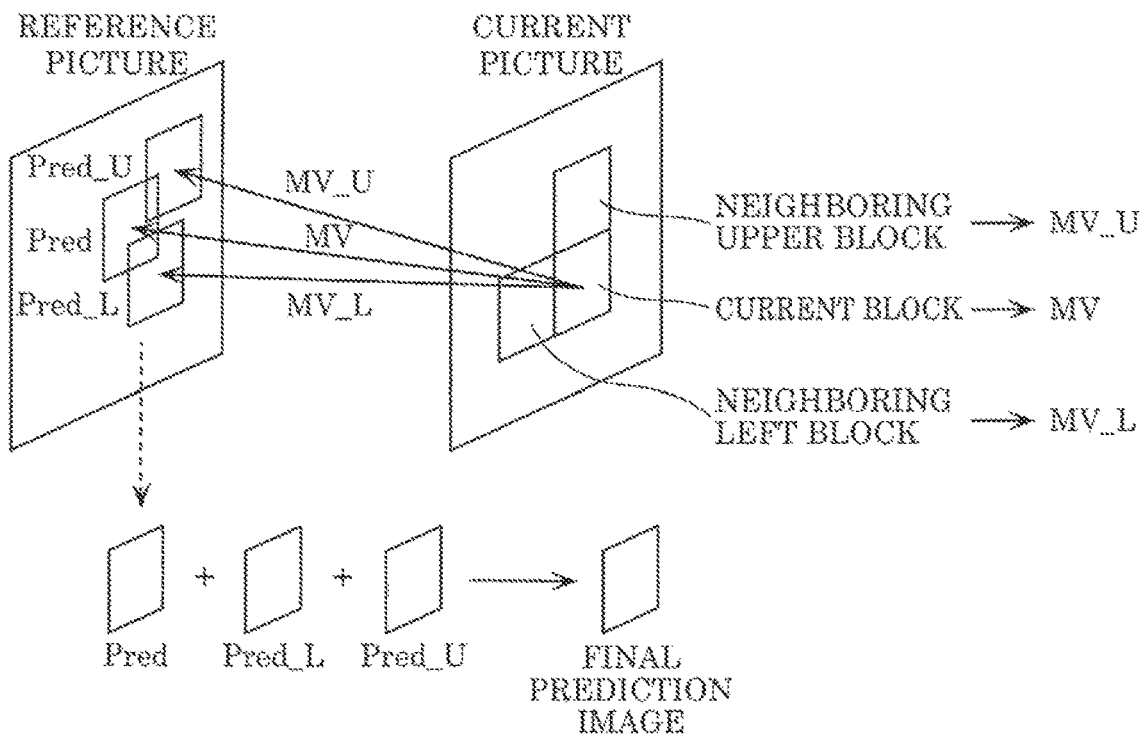

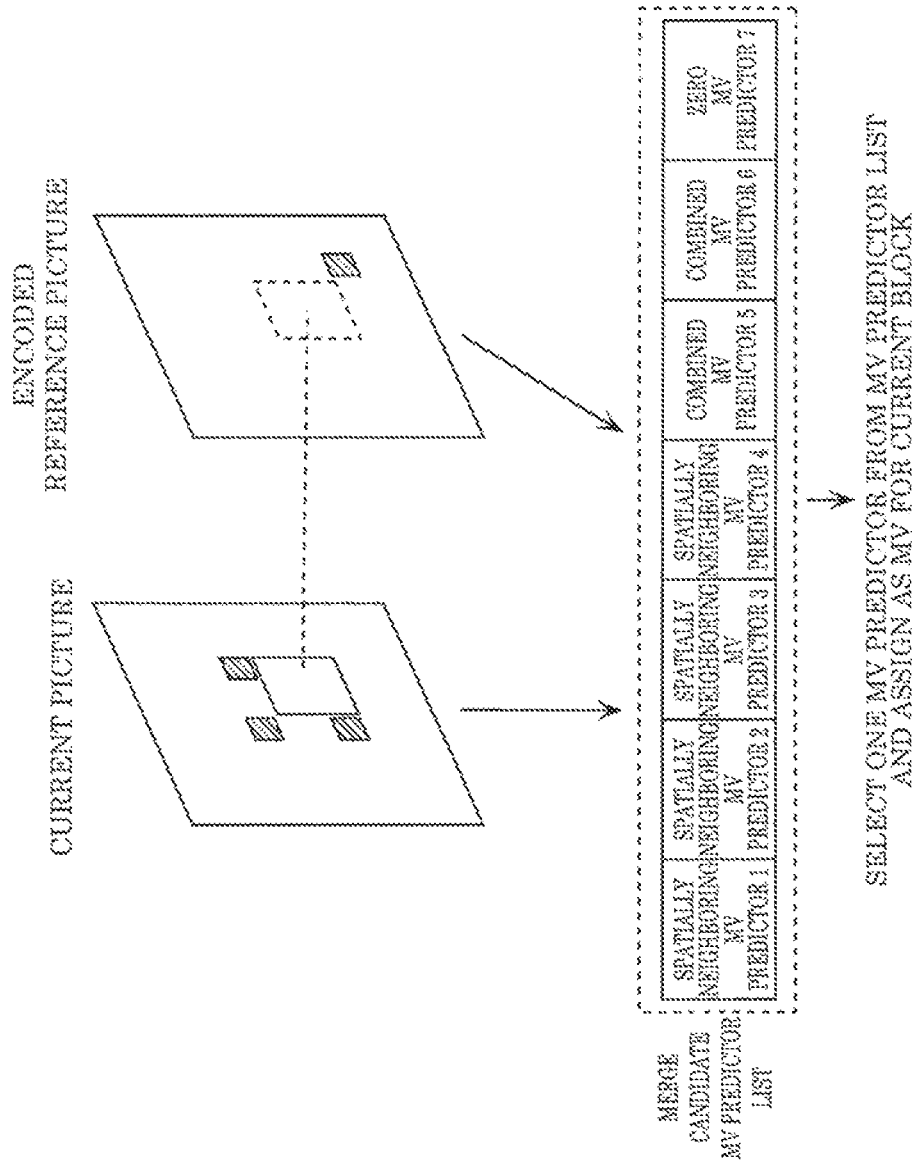

ENCODER AND DECODER FOR DERIVING THE MOTION VECTOR OF THE CURRENT BLOCK AND PERFORMING MOTION COMPENSATION

BACKGROUND

1. Technical Field

The present disclosure relates to an encoder, a decoder, an encoding method, and a decoding method.

2. Description of the Related Art

Conventionally, H.265 has been known as a standard for encoding videos. H.265 is also referred to as high efficiency video coding (HEVC).

SUMMARY

An encoder according to an aspect of the present disclosure includes circuitry and memory. Using the memory, the circuitry, in inter prediction processing: derives a first motion vector of a current block to be processed, using a motion vector of a previous block which has been previously processed; derives a second motion vector of the current block by performing motion estimation in vicinity of the first motion vector; and generates a prediction image of the current block by performing motion compensation using the second motion vector.

A decoder according to an aspect of the present disclosure includes circuitry and memory. Using the memory, the circuitry, in inter prediction processing: derives a first motion vector of a current block to be processed, using a motion vector of a previous block which has been previously processed; derives a second motion vector of the current block by performing motion estimation in vicinity of the first motion vector; and generates a prediction image of the current block by performing motion compensation using the second motion vector.

Note that these general or specific aspects may be implemented by a system, a device, a method, an integrated circuit, a computer program, or a non-transitory computer-readable recording medium such as a compact disc read only memory (CD-ROM), or by any combination of systems, devices, methods, integrated circuits, computer programs, or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 5B is a flow chart for illustrating an outline of a prediction image correction process performed via OBMC processing;

FIG. 5C is a conceptual diagram for illustrating an outline of a prediction image correction process performed via OBMC processing;

FIG. 9B is for illustrating an outline of a process for deriving a motion vector via merge mode;

DETAILED DESCRIPTION OF THE EMBODIMENTS

Figure 1:
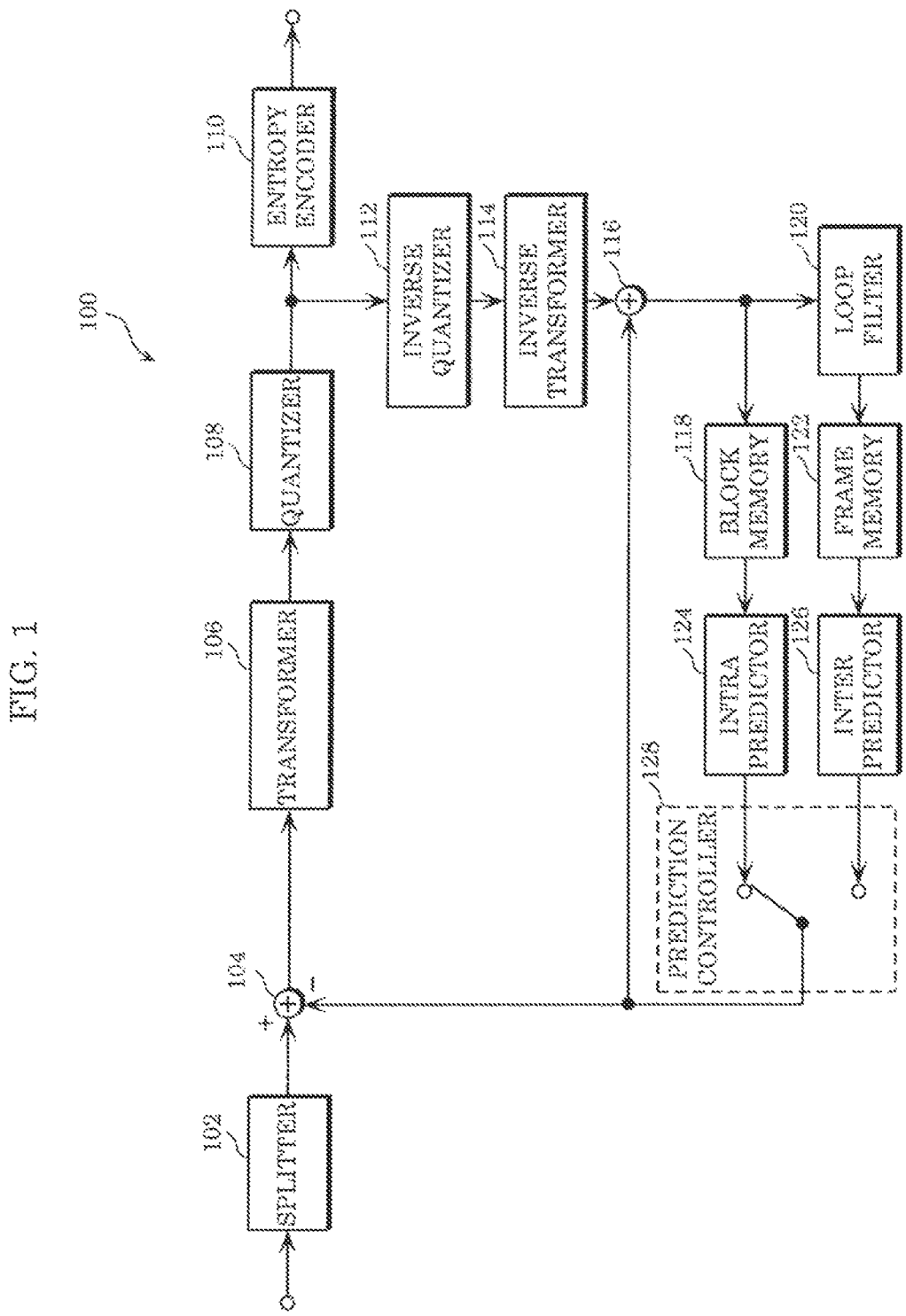
FIG. 1 is a block diagram illustrating a functional configuration of an encoder according to Embodiment 1.

An encoder according to an aspect of the present disclosure includes circuitry and memory. Using the memory, the circuitry: when encoding a current block in an inter prediction mode in which a decoder performs motion estimation, derives a first motion vector of the current block; stores, in the memory, the first motion vector derived; derives a second motion vector of the current block; and generates a prediction image of the current block by performing motion compensation using the second motion vector. In deriving the first motion vector, the first motion vector of the current block is derived using a first motion vector of a processed block.

Accordingly, the decoder can start deriving the first motion vector of the current block, for example after the first motion vector of a neighboring block is derived in the pipeline control, without waiting for completion of derivation of the second motion vector of the neighboring block. Thus, since the waiting time that occurs in the pipeline control performed by the decoder can be reduced as compared to the case of deriving the first motion vector using the second motion vector of the neighboring block, it is possible to reduce processing delay.

For example, in deriving the first motion vector, (i) a motion vector predictor list indicating a plurality of motion vector predictors may be generated using the first motion vector of the processed block, and (ii) the first motion vector of the current block may be determined from the plurality of motion vector predictors indicated on the motion vector predictor list.

For example, the inter prediction mode in which the decoder performs motion estimation may be a merge mode, and in deriving the second motion vector, the second motion vector may be derived by performing motion estimation in vicinity of the first motion vector.

For example, the inter prediction mode in which the decoder performs motion estimation may be a frame rate up-conversion (FRUC) mode, and in deriving the second motion vector, the second motion vector may be derived by performing motion estimation in vicinity of the first motion vector.

For example, the inter prediction mode in which the decoder performs motion estimation may be a frame rate up-conversion (FRUC) mode, and in deriving the second motion vector, (i) a third motion vector may be determined from the plurality of motion vector predictors indicated on the motion vector predictor list, and (ii) the second motion vector may be derived by performing motion estimation in vicinity of the third motion vector.

For example, in determining the first motion vector, the first motion vector may be derived based on, for each of prediction directions, an average or a median of the plurality of motion vector predictors indicated on the motion vector predictor list.

For example, in determining the first motion vector, among the plurality of motion vector predictors indicated on the motion vector predictor list, a motion vector predictor indicated at a top of the motion vector predictor list may be determined as the first motion vector.

For example, in generating the motion vector predictor list, each of the plurality of motion vector predictors may be derived using the first motion vector of the processed block or a second motion vector of the processed block, and in determining the first motion vector, the first motion vector may be determined from, among the plurality of motion vector predictors indicated on the motion vector predictor list, one or more motion vector predictor candidates derived using the second motion vector of the processed block.

Accordingly, since the encoder can determine the first motion vector using the highly reliable second motion vector, it is possible to suppress a decline in the reliability of the first motion vector.

For example, in generating the motion vector predictor list, each of the plurality of motion vector predictors may be derived using the first motion vector of the processed block or a second motion vector of the processed block, a motion vector predictor may be derived using the first motion vector of the processed block when the processed block is included in a picture including the current block, and a motion vector predictor may be derived using the second motion vector of the processed block when the processed block is included in a picture different from the picture including the current block.

Accordingly, when the processed block is included in a picture different from the picture including the current block, the encoder uses the second motion vector, and as a result, the reliability of the motion vector predictor can be improved.

For example, in generating the motion vector predictor list, each of the plurality of motion vector predictors may be derived using the first motion vector of the processed block or a second motion vector of the processed block, and whether to use the first motion vector of the processed block or the second motion vector of the processed block to perform motion vector predictor derivation may be determined according to a position of the processed block relative to the current block.

For example, in generating the motion vector predictor list, the motion vector predictor may be derived from a first processed block among a plurality of processed blocks included in a picture including the current block using a first motion vector of the first processed block, the first processed block being N blocks before the current block in a processing order, the motion vector predictor may be derived from a second processed block among the plurality of processed blocks using a first motion vector of the second processed block, the second processed block being after the first processed block in the processing order, and the motion vector predictor may be derived from a third processed block among the plurality of processed blocks using a second motion vector of the third processed block, the third processed block being before the first processed block in the processing order.

Accordingly, the encoder uses the second motion vector of the third processed block which is before the first processed block in the processing order, and as a result, the reliability of the motion vector predictor can be improved.

For example, N may be 1.

For example, the first motion vector may be further used in other processing different from motion vector predictor derivation.

For example, the other processing may be loop filtering.

For example, the second motion vector may be used in loop filtering.

For example, when encoding the current block in a low delay mode, the first motion vector of the current block may be derived using the first motion vector of the processed block.

Accordingly, the encoder can perform appropriate processing according to whether or not to use the low delay mode.

For example, information indicating whether to encode the current block in the low delay mode may be encoded into a sequence header region, a picture header region, a slice header region, or an auxiliary information region.

For example, whether to encode the current block in the low delay mode may be switched according to a size of a current picture including the current block.

For example, whether to encode the current block in the low delay mode may be switched according to processing capability of the decoder.

For example, whether to encode the current block in the low delay mode may be switched according to a profile or level information assigned to a current stream to be encoded.

A decoder according to an aspect of the present disclosure includes: circuitry and memory. Using the memory, the circuitry: when decoding a current block in an inter prediction mode in which the decoder performs motion estimation, derives a first motion vector of the current block; stores, in the memory, the first motion vector derived; derives a second motion vector of the current block; and generates a prediction image of the current block by performing motion compensation using the second motion vector. In deriving the first motion vector, the first motion vector of the current block is derived using a first motion vector of a processed block.

Accordingly, the decoder can start deriving the first motion vector of the current block, for example after the first motion vector of a neighboring block is derived in the pipeline control, without waiting for completion of derivation of the second motion vector of the neighboring block. Thus, since the waiting time that occurs in the pipeline control performed by the decoder can be reduced as compared to the case of deriving the first motion vector using the second motion vector of the neighboring block, it is possible to reduce processing delay.

For example, in deriving the first motion vector, (i) a motion vector predictor list indicating a plurality of motion vector predictors may be generated using the first motion vector of the processed block, and (ii) the first motion vector of the current block may be determined from the plurality of motion vector predictors indicated on the motion vector predictor list.

For example, the inter prediction mode in which the decoder performs motion estimation may be a merge mode, and in deriving the second motion vector, the second motion vector may be derived by performing motion estimation in vicinity of the first motion vector.

For example, the inter prediction mode in which the decoder performs motion estimation may be a frame rate up-conversion (FRUC) mode, and in deriving the second motion vector, the second motion vector may be derived by performing motion estimation in vicinity of the first motion vector.

For example, the inter prediction mode in which the decoder performs motion estimation may be a frame rate up-conversion (FRUC) mode, and in deriving the second motion vector, (i) a third motion vector may be determined from the plurality of motion vector predictors indicated on the motion vector predictor list, and (ii) the second motion vector may be derived by performing motion estimation in vicinity of the third motion vector.

For example, in determining the first motion vector, the first motion vector may be derived based on, for each of prediction directions, an average or a median of the plurality of motion vector predictors indicated on the motion vector predictor list.

For example, in determining the first motion vector, among the plurality of motion vector predictors indicated on the motion vector predictor list, a motion vector predictor indicated at a top of the motion vector predictor list may be determined as the first motion vector.

For example, in generating the motion vector predictor list, each of the plurality of motion vector predictors may be derived using the first motion vector of the processed block or a second motion vector of the processed block, and in determining the first motion vector, the first motion vector may be determined from, among the plurality of motion vector predictors indicated on the motion vector predictor list, one or more motion vector predictor candidates derived using the second motion vector of the processed block.

Accordingly, since the decoder can determine the first motion vector using the highly reliable second motion vector, it is possible to suppress a decline in the reliability of the first motion vector.

For example, in generating the motion vector predictor list, each of the plurality of motion vector predictors may be derived using the first motion vector of the processed block or a second motion vector of the processed block, a motion vector predictor may be derived using the first motion vector of the processed block when the processed block is included in a picture including the current block, and a motion vector predictor may be derived using the second motion vector of the processed block when the processed block is included in a picture different from the picture including the current block.

Accordingly, when the processed block is included in a picture different from the picture including the current block, the decoder uses the second motion vector, and as a result, the reliability of the motion vector predictor can be improved.

For example, in generating the motion vector predictor list, each of the plurality of motion vector predictors may be derived using the first motion vector of the processed block or a second motion vector of the processed block, and whether to use the first motion vector of the processed block or the second motion vector of the processed block to perform motion vector predictor derivation may be determined according to a position of the processed block relative to the current block.

For example, in generating the motion vector predictor list, the motion vector predictor may be derived from a first processed block among a plurality of processed blocks included in a picture including the current block using a first motion vector of the first processed block, the first processed block being N blocks before the current block in a processing order, the motion vector predictor may be derived from a second processed block among the plurality of processed blocks using a first motion vector of the second processed block, the second processed block being after the first processed block in the processing order, and the motion vector predictor may be derived from a third processed block among the plurality of processed blocks using a second motion vector of the third processed block, the third processed block being before the first processed block in the processing order.

Accordingly, the decoder uses the second motion vector of the third processed block which is before the first processed block in the processing order, and as a result, the reliability of the motion vector predictor can be improved.

For example, N may be 1.

For example, the first motion vector may be further used in other processing different from motion vector predictor derivation.

For example, the other processing may be loop filtering.

For example, the second motion vector may be used in loop filtering.

For example, when decoding the current block in a low delay mode, the first motion vector of the current block may be derived using the first motion vector of the processed block.

Accordingly, the decoder can perform appropriate processing according to whether or not to use the low delay mode.

For example, information indicating whether to decode the current block in the low delay mode may be parsed from a sequence header region, a picture header region, a slice header region, or an auxiliary information region, and whether to decode the current block in the low delay mode may be determined based on the information.

For example, a pipeline configuration of the decoder may include: a first stage in which the first motion vector of the current block is derived; and a second stage which is different from the first stage and in which the second motion vector of the current block is derived, and processing of the first stage for the current block may start when processing of the first stage for a block immediately before the current block in a processing order is completed, without waiting for completion of processing of the second stage for a block which is M blocks before the current block in the processing order.

For example, a pipeline configuration of the decoder may include: a first stage in which the first motion vector of the current block is derived; and a second stage which is different from the first stage and in which the second motion vector of the current block is derived, and processing of the first stage for the current block may start when a first motion vector of a block which is M blocks before the current block in a processing order is derived, without waiting for completion of processing of the second stage for the block which is M blocks before the current block in the processing order.

For example, M may be 1.

An encoding method according to an aspect of the present disclosure includes: when encoding a current block in an inter prediction mode in which a decoder performs motion estimation, deriving a first motion vector of the current block; storing, in memory, the first motion vector derived; deriving a second motion vector of the current block; and generating a prediction image of the current block by performing motion compensation using the second motion vector. In deriving the first motion vector, the first motion vector of the current block is derived using a first motion vector of a processed block.

Accordingly, the decoder can start deriving the first motion vector of the current block, for example after the first motion vector of a neighboring block is derived in the pipeline control, without waiting for completion of derivation of the second motion vector of the neighboring block. Thus, since the waiting time that occurs in the pipeline control performed by the decoder can be reduced as compared to the case of deriving the first motion vector using the second motion vector of the neighboring block, it is possible to reduce processing delay.

A decoding method according to an aspect of the present disclosure includes: when decoding a current block in an inter prediction mode in which a decoder performs motion estimation, deriving a first motion vector of the current block; storing, in memory, the first motion vector derived; deriving a second motion vector of the current block; and generating a prediction image of the current block by performing motion compensation using the second motion vector. In deriving the first motion vector, the first motion vector of the current block is derived using a first motion vector of a processed block.

Accordingly, the decoding method makes it possible to start deriving the first motion vector of the current block, for example after the first motion vector of a neighboring block is derived in the pipeline control, without waiting for completion of derivation of the second motion vector of the neighboring block. Thus, since the waiting time that occurs in the pipeline control performed by the decoder can be reduced as compared to the case of deriving the first motion vector using the second motion vector of the neighboring block, it is possible to reduce processing delay.

Note that these general or specific aspects may be implemented by a system, a device, a method, an integrated circuit, a computer program, or a non-transitory computer-readable recording medium such as a CD-ROM, or by any combination of systems, devices, methods, integrated circuits, computer programs, or recording media.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
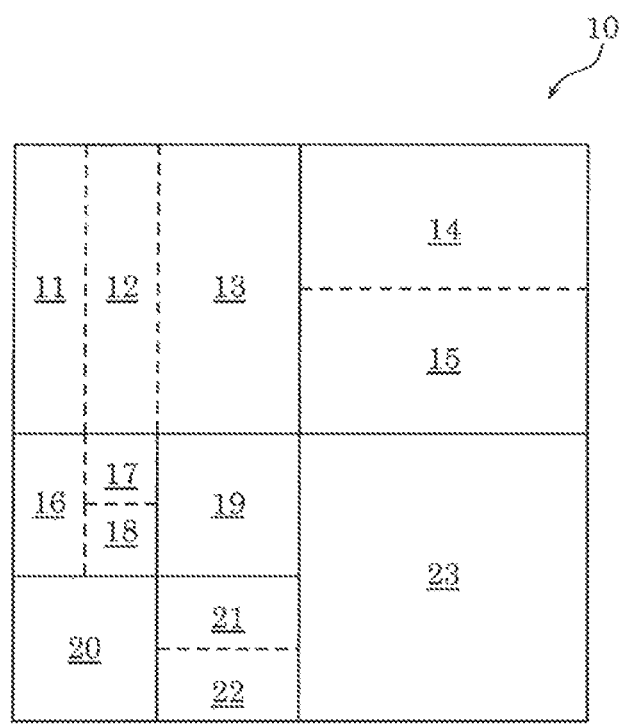
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantized]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
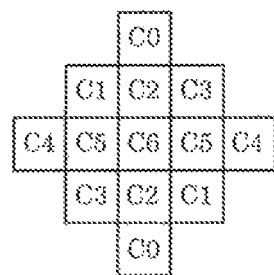
FIG. 4A illustrates one example of a filter shape used in ALF.
Figure 4B:
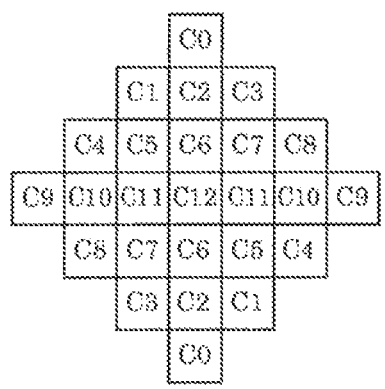
FIG. 4B illustrates another example of a filter shape used in ALF.
Figure 4C:
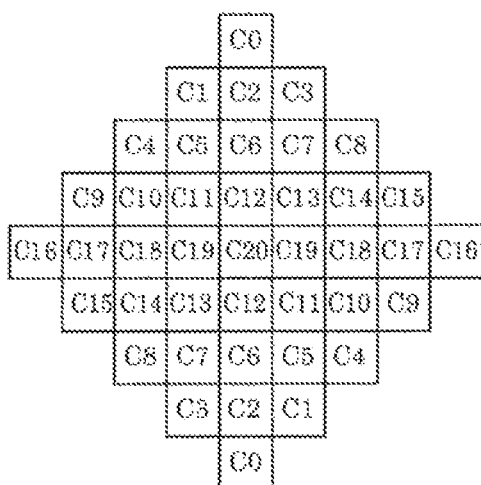
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see H.265 (ISO/IEC 23008-2 HEVC (High Efficiency Video Coding))).

Figure 5A:
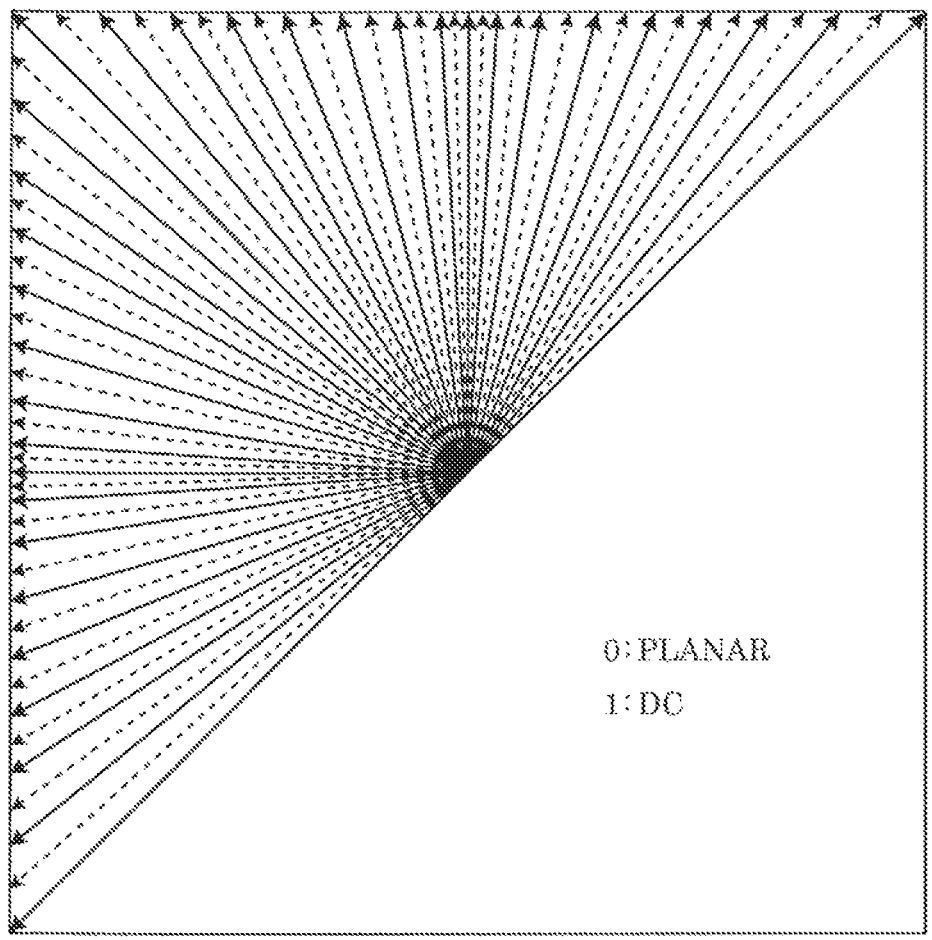
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
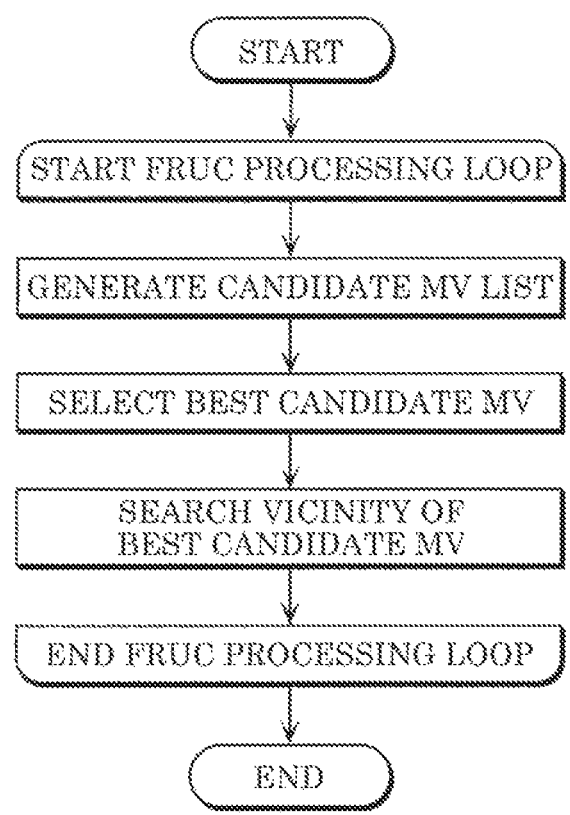
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
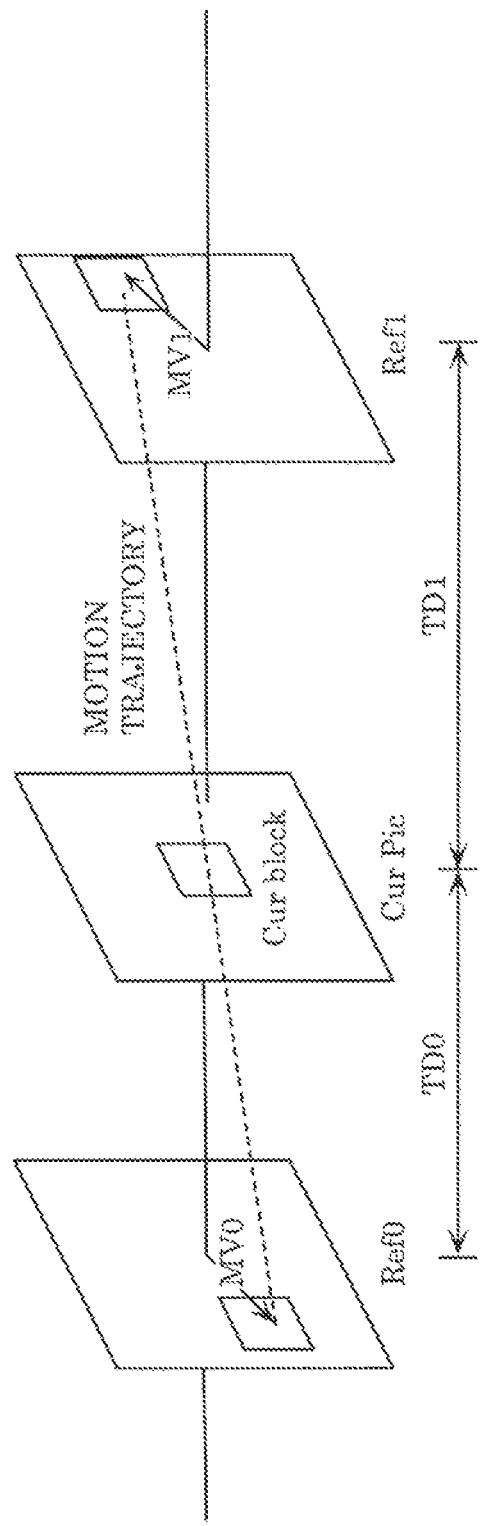
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
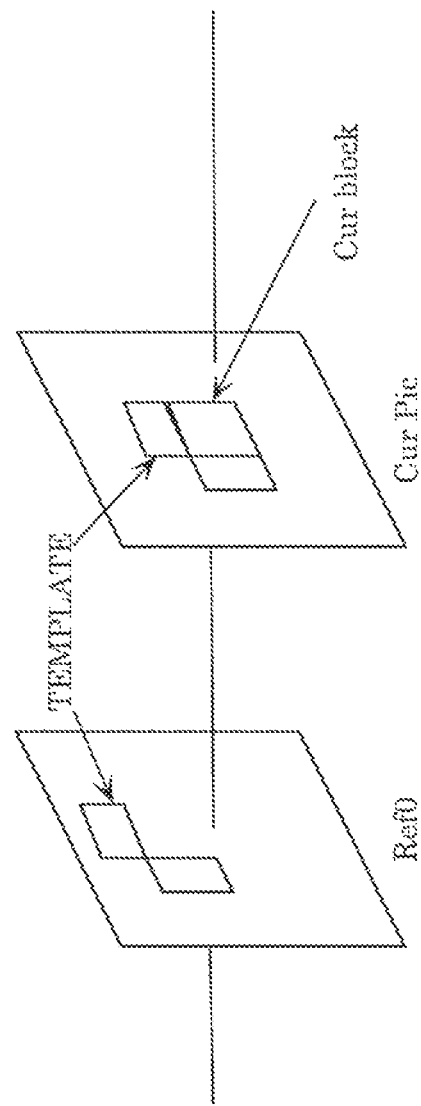
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Rem) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
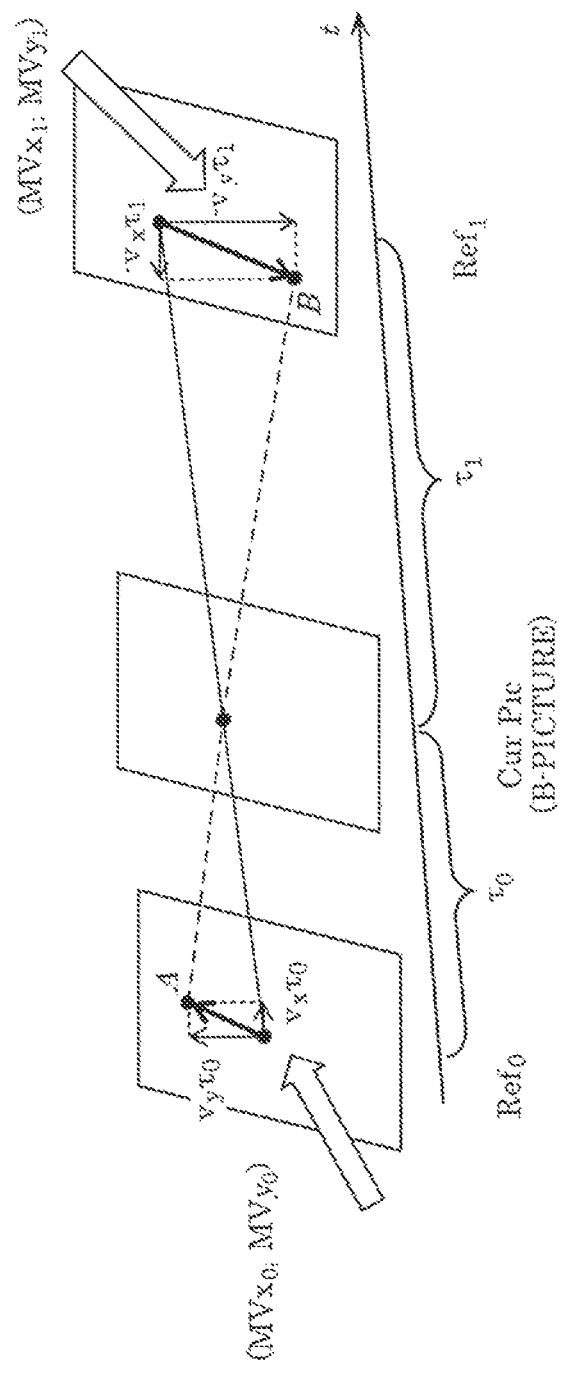
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
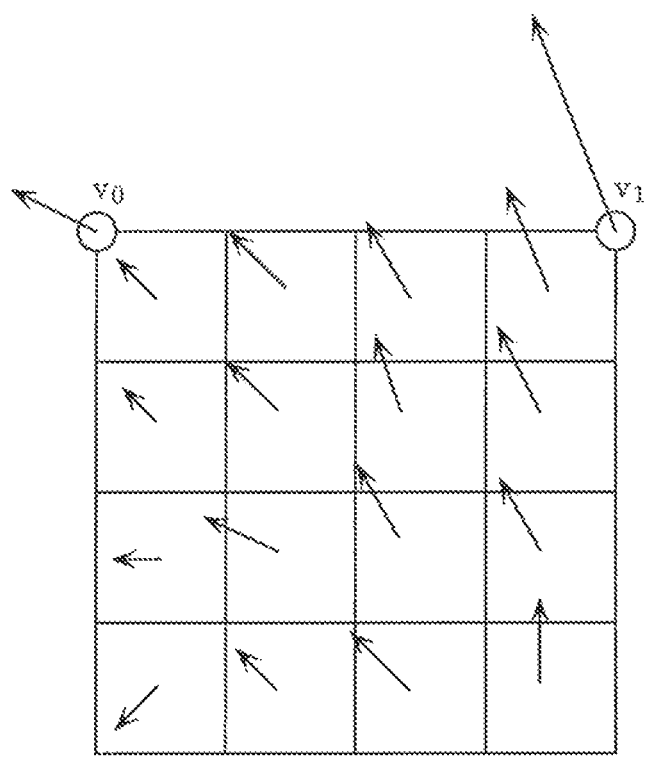
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
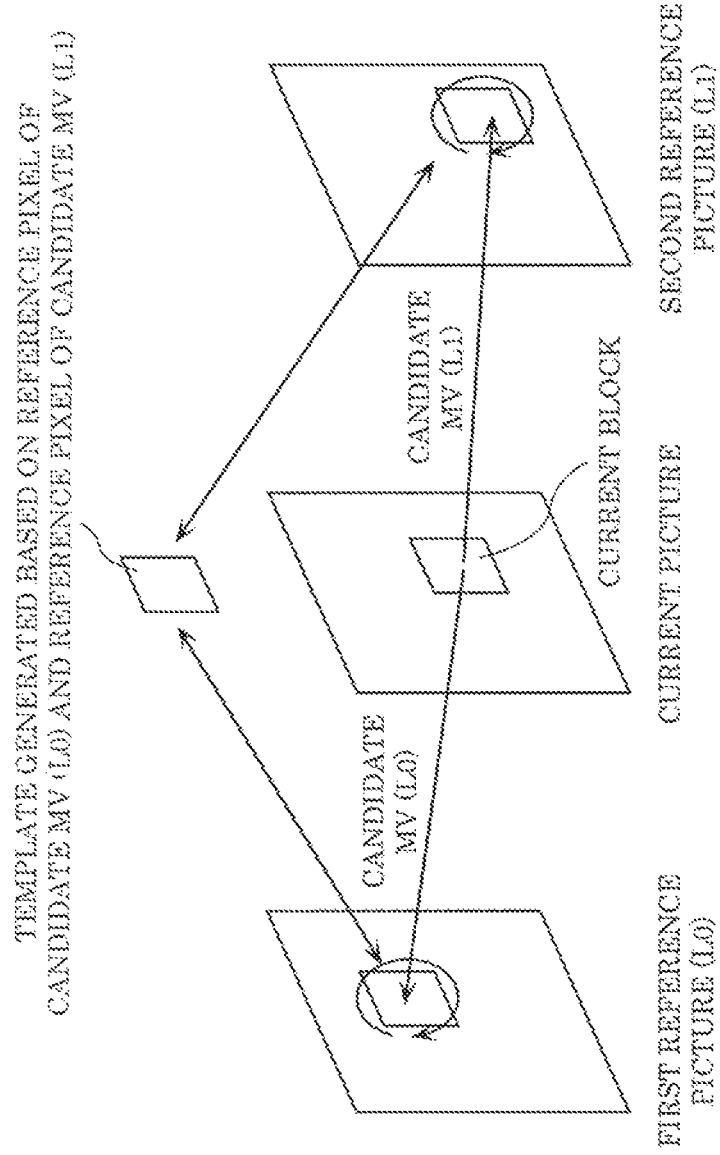
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
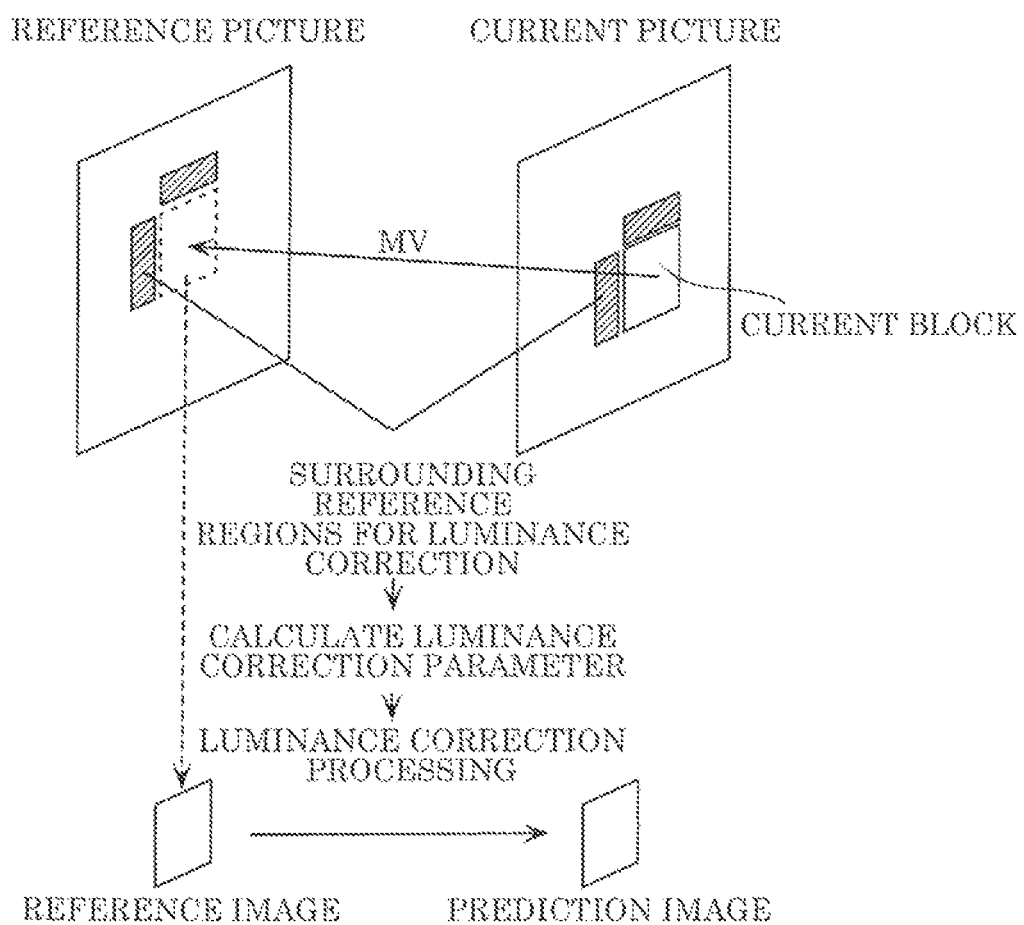
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
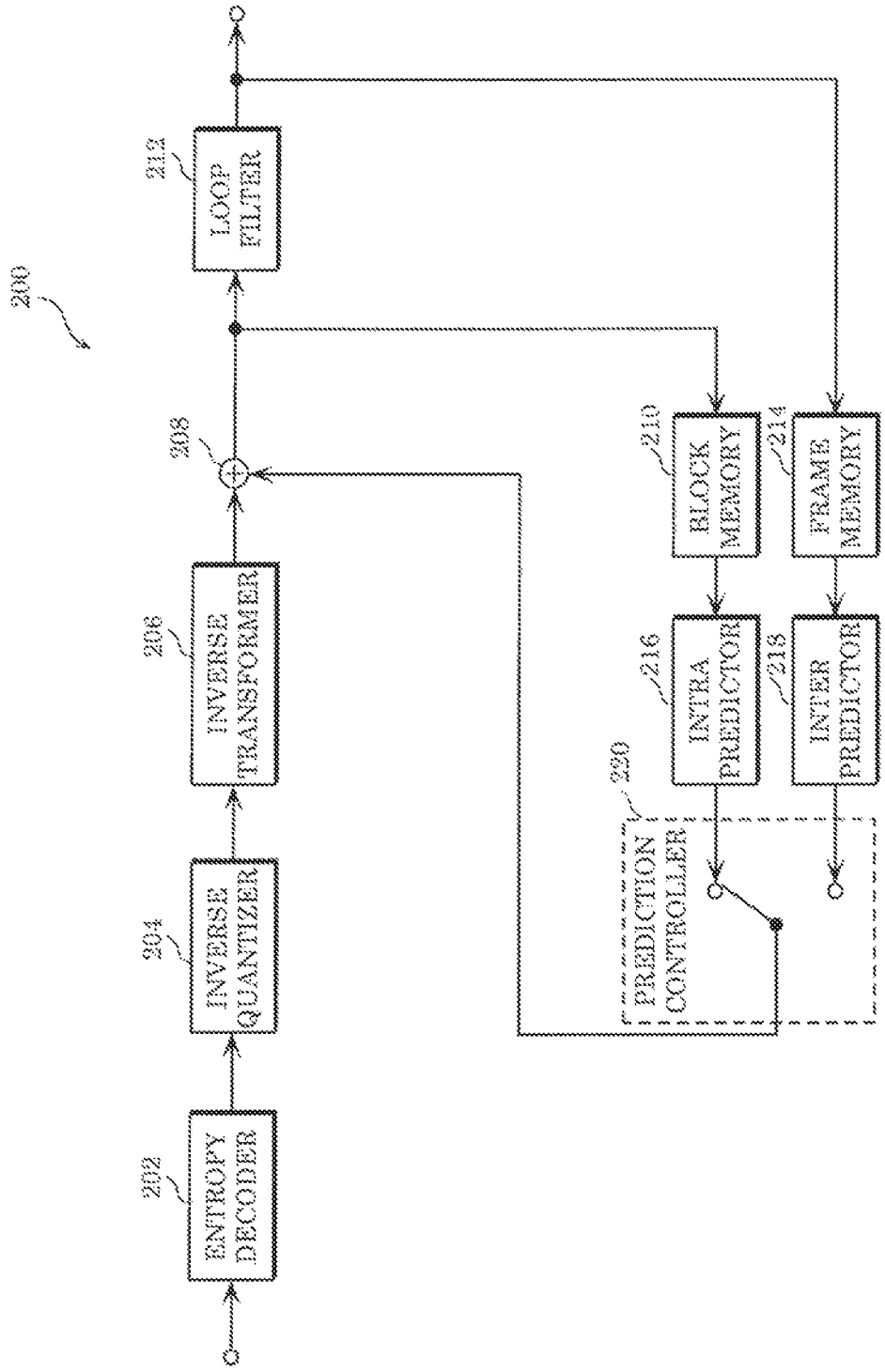
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantized]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

First Example of Inter Prediction Processing

Figure 11:
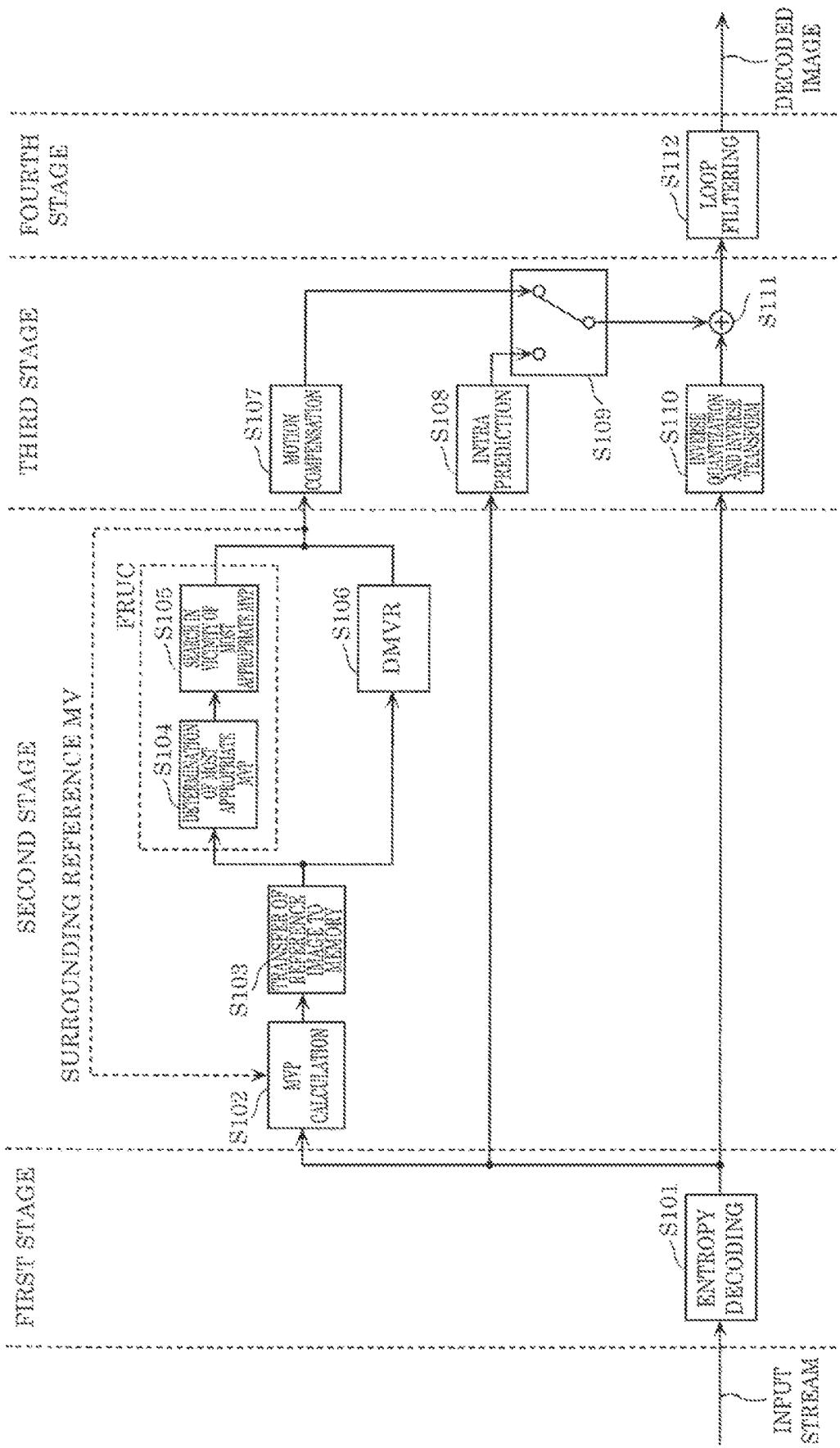
FIG. 11 is a schematic diagram illustrating a first example of a pipeline configuration according to Embodiment 1.

FIG. 11 is a diagram illustrating a first example of the outline of a pipeline configuration used for decoder 200. This pipeline configuration includes four stages, namely a first stage, a second stage, a third stage, and a fourth stage.

In the first stage, decoder 200 performs entropy decoding on an input stream to be decoded, and obtains information necessary for decoding (S101).

In the second stage, decoder 200 derives, using the information, a motion vector (MV) to be used in inter prediction processing. Specifically, first, with reference to a neighboring decoded block, decoder 200 derives one or more motion vector predictors (hereinafter referred to as MVPs) that are motion vector candidates (S102). Next, decoder 200 transfers a reference image to memory according to the one or more MVPs derived (S103).

Next, when the inter prediction mode is the FRUC mode, decoder 200 determines a motion vector by determining the most appropriate MVP (S104) and performing search in the vicinity of the most appropriate MVP (S105). When the inter prediction mode is the merge mode, decoder 200 determines a motion vector by performing the DMVR processing (S106).

In the third stage, decoder 200 decodes a residual image by performing inverse quantization and inverse transform processing (S110). When the current block is an intra block, decoder 200 decodes a prediction image by performing intra prediction processing (S108). When the current block is an inter block, decoder 200 decodes a prediction image by performing motion compensation processing etc., using the motion vector derived in the second stage (S107).

Next, decoder 200 selects one of the prediction image generated through the intra prediction processing and the prediction image generated through the inter prediction processing (S109), and generates a reconstructed image by adding the residual image and the selected prediction image (S111).

In the fourth stage, decoder 200 generates a decoded image by performing loop filtering on the reconstructed image (S112).

Since the motion vector derived in the second stage is used as a surrounding reference motion vector for deriving one or more MVPs in the decoding processing on a subsequent block, the motion vector derived in the second stage is fed back as an input for the MVP derivation processing (S102). This feedback processing needs to be performed in one stage in order to refer to a motion vector that belongs to a block immediately before the current block in the processing order. As a result, a lot of processing is performed in the second stage as illustrated in FIG. 11, and the second stage, therefore, takes a long processing duration.

Note that this outline of the pipeline configuration is a mere example; a part of the processing described may be removed, processing not described may be added, or the boundaries of the stages may be modified.

Figure 12:
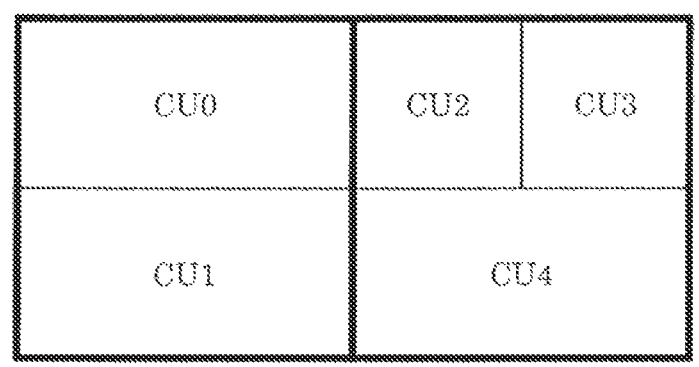
FIG. 12 is a schematic diagram illustrating an example of block partition used in the description of pipeline processing according to Embodiment 1.

FIG. 12 is a schematic diagram illustrating an example of block partition used in the description of pipeline processing. The example of block partition illustrated in FIG. 12 shows two coding tree units. One coding tree unit includes two coding units CU0 and CU1, and the other coding tree unit includes three coding units CU2, CU3, and CU4.

Coding units CU0, CU1, and CU4 are the same in size. Coding units CU2 and CU3 are the same in size. The size of each of coding units CU0, CU1, and CU4 is twice as large as the size of each of coding units CU2 and CU3.

Figure 13:
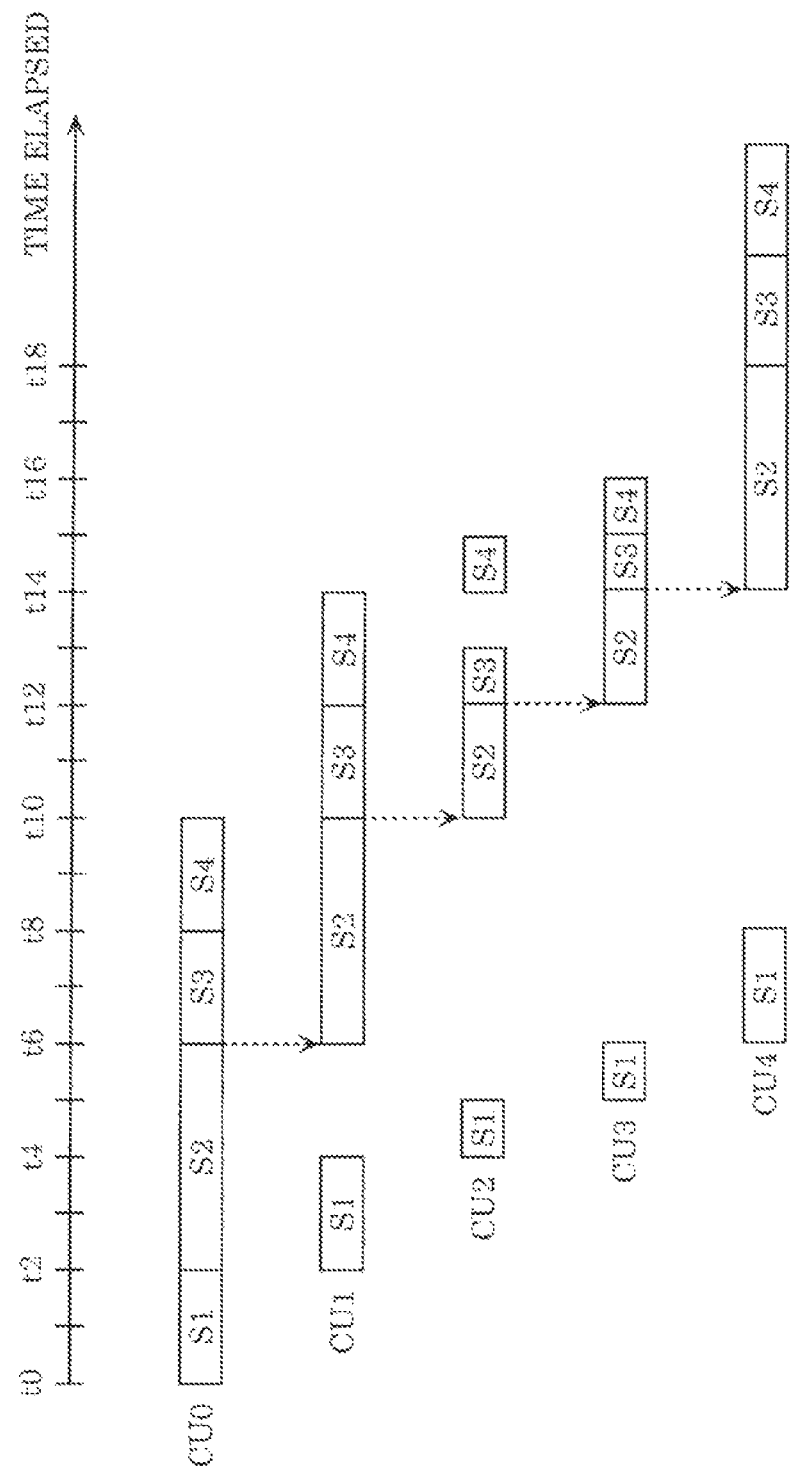
FIG. 13 is a timing diagram illustrating an example of processing timing in the first example of the pipeline configuration according to Embodiment 1.

FIG. 13 illustrates, in time series, processing timing of the respective stages for each block to be decoded, in the first example of the outline of the pipeline configuration described with reference to FIG. 11. FIG. 13 illustrates the processing timing for five blocks to be decoded, namely coding units CU0 through CU4 illustrated in FIG. 12. S1 through S4 in FIG. 13 denote the processing durations of the first through fourth stages illustrated in FIG. 11.

Since coding units CU0, CU1, and CU4 are twice as large as coding units CU2 and CU3, the processing durations of the respective stages for coding units CU0, CU1, and CU4 are also twice as large.

Since the second stage takes a long time to process as described with reference to FIG. 11, the processing duration of the second stage is twice as long as each of the processing durations of the other stages.

The processing of each stage starts after the processing of the same stage for the block immediately before the current block in the processing order is finished. For example, the processing of the second stage for coding unit CU1 starts at time t6 at which the second stage for coding unit CU0 is finished. At this time, since the processing duration of the second stage for coding unit CU0 is twice as long as the processing duration of the first stage for coding unit CU1 coding unit CU1 has waiting time from time t4 at which the processing of the first stage is finished until time t6 at which the processing of the second stage starts.

In such a manner, there is always waiting time before the second stage starts, and the waiting time accumulates every time the processing for the current blocks proceeds. As a consequence, coding unit CU4 has waiting time from time t8 at which the processing of the first stage is finished until time t14 at which the processing of the second stage starts.

As a result, at the time of completion of the decoding processing on one picture, the processing duration including the waiting time becomes about twice as long as the processing duration originally intended. This may make it difficult to complete the processing on all the blocks within the processing duration allocated to one picture.

Figure 14:
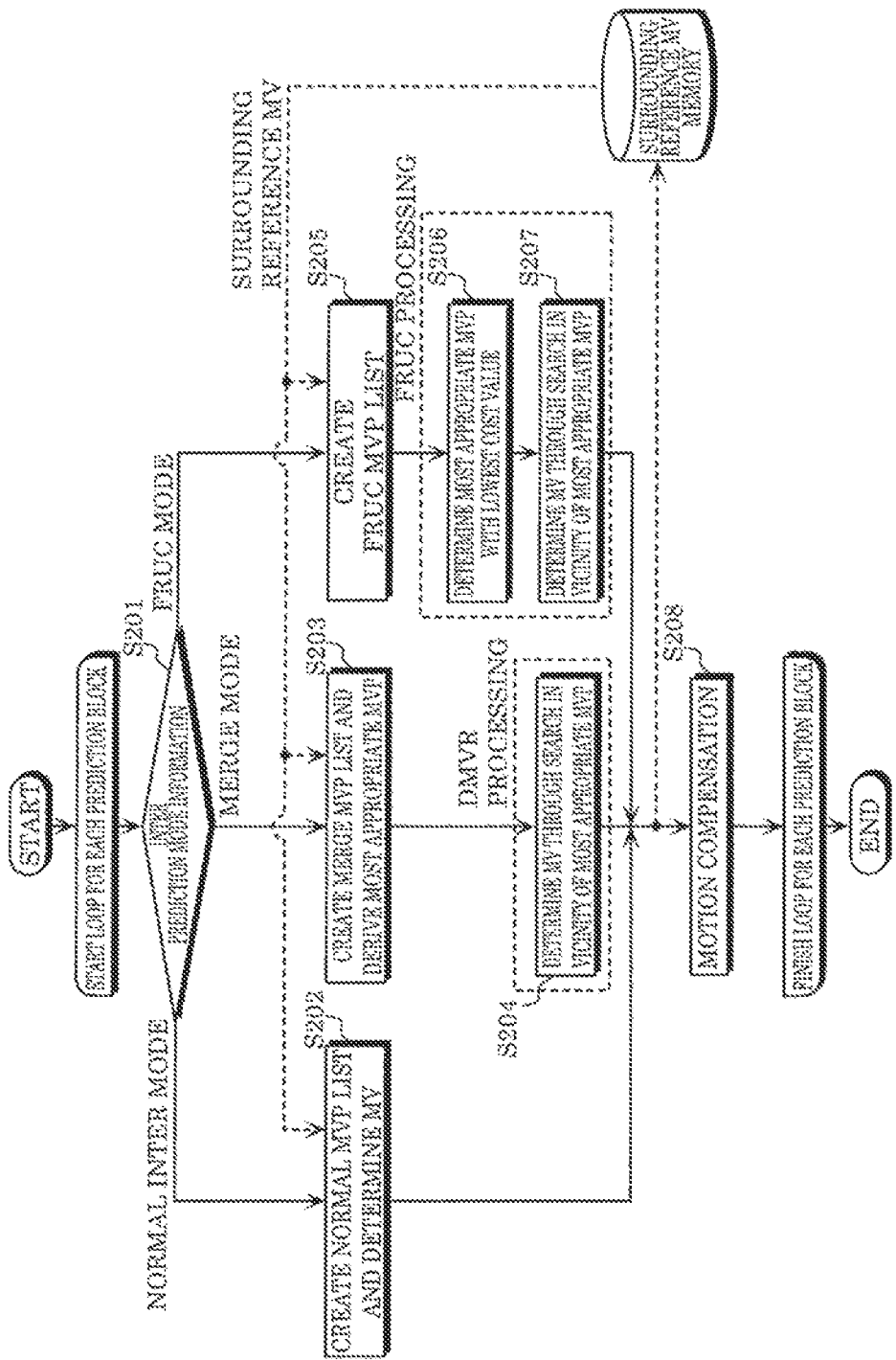
FIG. 14 is a flow chart of inter prediction processing in the first example of the pipeline configuration according to Embodiment 1.

FIG. 14 is a flow chart of inter prediction processing in the first example of the outline of the pipeline configuration described with reference to FIG. 11. The processing illustrated in FIG. 14 is repeatedly performed for each prediction block, which is the processing unit of inter-frame prediction processing. The processing illustrated in FIG. 14 is performed by encoder 100 and decoder 200. Although the following mainly describes the operations of inter predictor 126 included in encoder 100, the same applies to the operations of inter predictor 218 included in decoder 200.

Inter predictor 126 selects an inter prediction mode for a current block, that is, a current block to be encoded or decoded, from among a plurality of modes (normal inter mode, merge mode, FRUC mode, etc.). Inter predictor 126 derives a motion vector (MV) using the inter prediction mode selected. Specifically, the inter prediction mode for the current block is indicated by inter prediction mode information.

When the normal inter mode is used (normal inter mode in S201), inter predictor 126 refers to motion vectors of neighboring processed blocks and obtains a plurality of motion vector predictors (MVPs), and creates a normal MVP list indicating the plurality of MVPs obtained. Inter predictor 126 specifies one MVP from the plurality of MVPs indicated on the normal MVP list created, and adds a motion vector difference (MVD) to the specified MVP to determine a final motion vector (S202). Specifically, encoder 100 generates the motion vector difference from the motion vector and the MVP, and transmits the generated motion vector difference to decoder 200. Decoder 200 obtains a motion vector by adding the motion vector difference received, to the motion vector predictor.

When the merge mode is used (merge mode in S201), inter predictor 126 refers to motion vectors of neighboring processed blocks and obtains one or more MVPs, and creates a merge MVP list indicating the one or more MVPs obtained. Next, inter predictor 126 specifies one MVP from the created merge MVP list as the most appropriate MVP (S203). Next, inter predictor 126 determines a final motion vector by performing DMVR processing in which a position with the lowest cost value is searched for in the vicinity of the most appropriate MVP, using a processed picture (S204).

When the FRUC mode is used (FRUC in S201), inter predictor 126 refers to motion vectors of neighboring processed blocks and obtains a plurality of MVPs, and creates an FRUC MVP list indicating the plurality of MVPs obtained (S205). Next, inter predictor 126 derives the most appropriate MVP with the lowest cost value from the plurality of MVPs indicated on the FRUC MVP list, using a bilateral matching method or a template matching method (S206). Next, inter predictor 126 further performs the same processing to search for a position with the lowest cost in the vicinity of the most appropriate MVP derived, and determines, as a final motion vector, the motion vector obtained through the search (S207).

The final motion vector derived using each method is used as the surrounding reference MV for deriving one or more MVPs for a subsequent block, and is thus stored in surrounding reference MV memory.

Lastly, inter predictor 126 generates a prediction image by performing motion compensation processing etc. using the final motion vector (S208).

As can be understood from the above, in the case of processing the current block in the merge mode or the FRUC mode, it requires many more steps to derive the final motion vector as compared to the case of processing in the other mode. This prolongs the processing duration, which causes an increase in the waiting time to wait for the next stage in the pipeline control described with reference to FIG. 13.

Note that the processing flow illustrated here is a mere example; a part of the processing described may be removed, or processing not described may be added.

Moreover, the processing flow described herein is basically common to encoder 100 and decoder 200; the only difference is whether the signal necessary for the processing is encoded into a stream or parsed from a stream.

Second Example of Inter Prediction Processing

Figure 15:
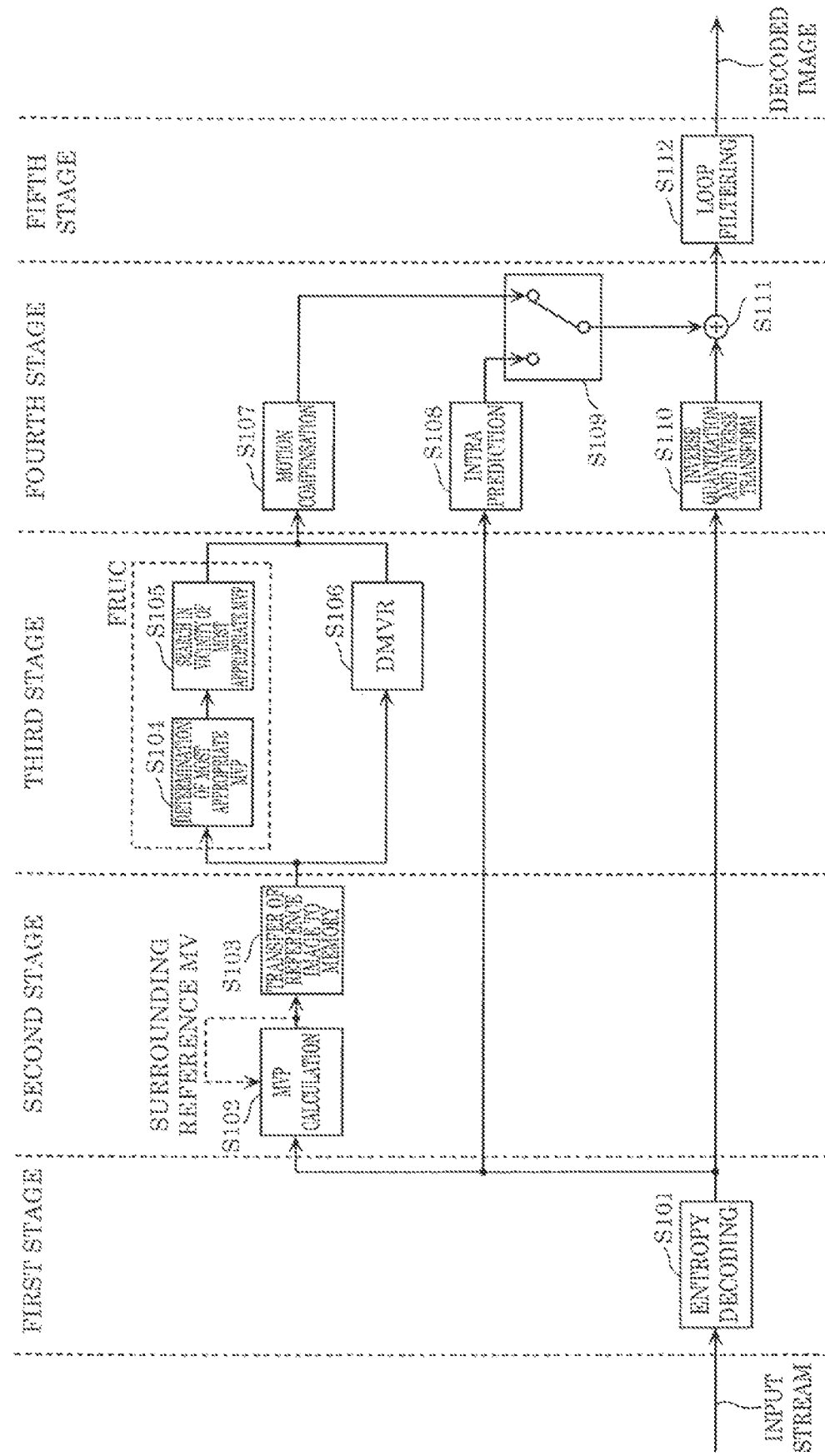
FIG. 15 is a schematic diagram illustrating a second example of the pipeline configuration according to Embodiment 1.

FIG. 15 is a diagram illustrating a second example of the outline of the pipeline configuration used for decoder 200. The second example illustrated in FIG. 15 is different from the first example described with reference to FIG. 11 in that decoder 200 uses, as the surrounding reference motion vector of a neighboring decoded block to be used for the MVP derivation in the inter prediction processing, a temporary motion vector (a first motion vector) generated using one or more MVPs obtained in the MVP derivation processing, rather than the final motion vector (a second motion vector) obtained by performing all the processing related to the motion vector derivation.

In such a manner, by using the temporary motion vector as the surrounding reference motion vector for deriving one or more MVPs in the decoding processing on a subsequent block, it is possible to significantly reduce the length of the feedback loop. As a result, the second stage, which is one long stage in the first example, can be divided into two shorter stages, namely the second stage and the third stage, while satisfying the condition that the feedback loop does not extend over plural stages.

Note that this outline of the pipeline configuration is a mere example; a part of the processing described may be removed, processing not described may be added, or the boundaries of the stages may be modified.

Figure 16:
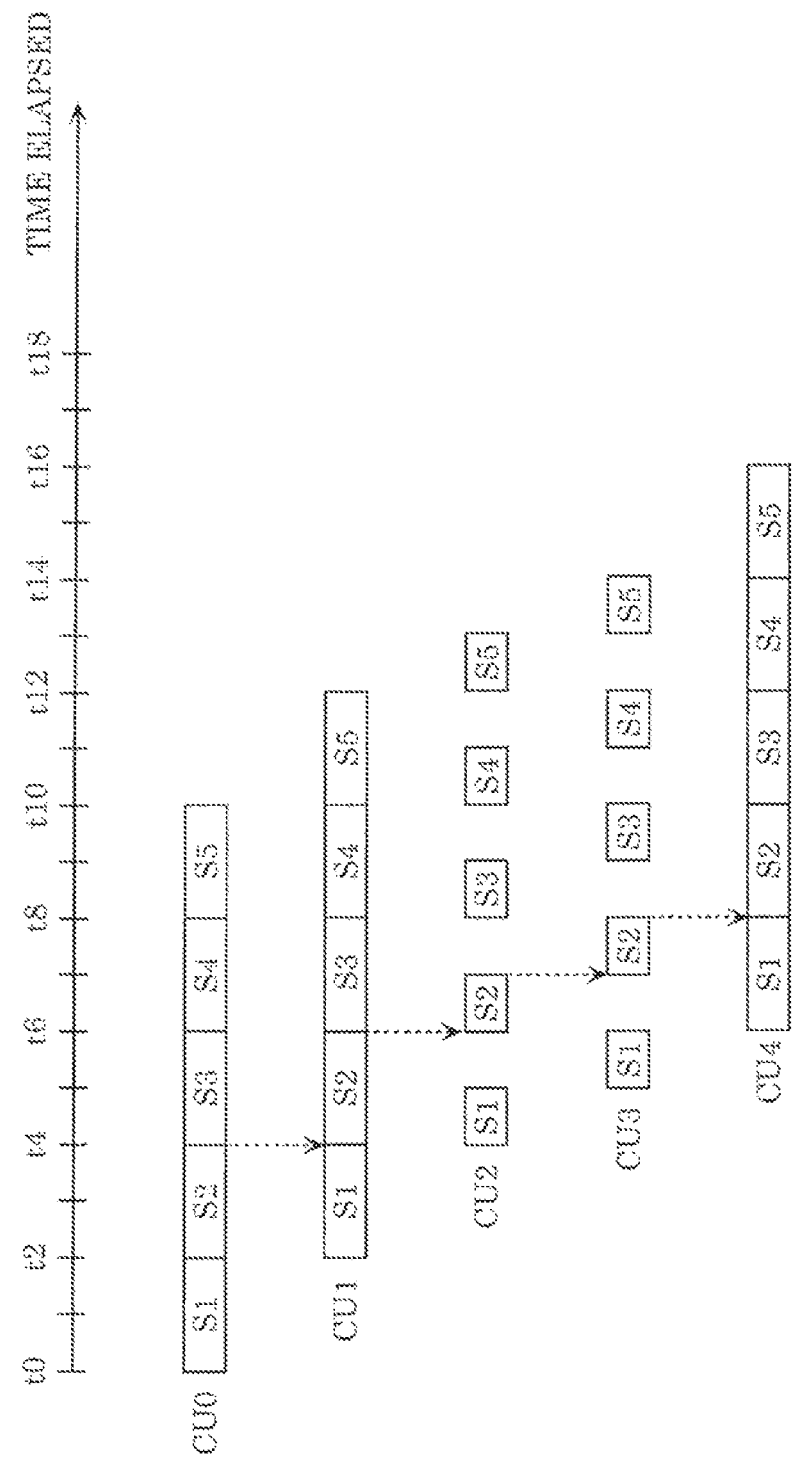
FIG. 16 is a timing diagram illustrating an example of processing timing in the second example of the pipeline configuration according to Embodiment 1.

FIG. 16 illustrates, in time series, processing timing of the respective stages for each block to be decoded, in the second example of the outline of the pipeline configuration described with reference to FIG. 15.

As in FIG. 13, FIG. 16 illustrates the processing timing for five blocks to be decoded, namely coding units CU0 through CU4 illustrated in the block partition example in FIG. 12. In the first example, the second stage is one long stage, whereas in the second example, the second stage is divided into two shorter stages, namely the second stage and the third stage. The length of each of the second and third stages is the same as the length of each of the other stages.

The processing of each stage starts after the processing of the same stage for the block immediately before the current block in the processing order is finished. For example, the processing of the second stage for coding unit CU1 starts at time t4 at which the second stage for coding unit CU0 is finished. At this time, since the processing duration of the second stage for coding unit CU0 is the same as the processing duration of each of the other stages, the processing of the second stage for coding unit CU1 can start with no waiting time after the processing of the first stage for coding unit CU1 is finished.

On the other hand, since coding unit CU2 is smaller in block size than coding unit CU1 which is immediately before coding unit CU2 in the processing order, there is waiting time between the first stage and the second stage, but this waiting time is not accumulated and becomes zero when the processing for coding unit CU4 starts.

As a result, even with the waiting time, the processing duration required for completing the decoding processing for one picture is about the same as the processing duration originally intended, and it is more likely to be able to complete the processing on all the blocks within the processing duration allocated to one picture.

Figure 17:
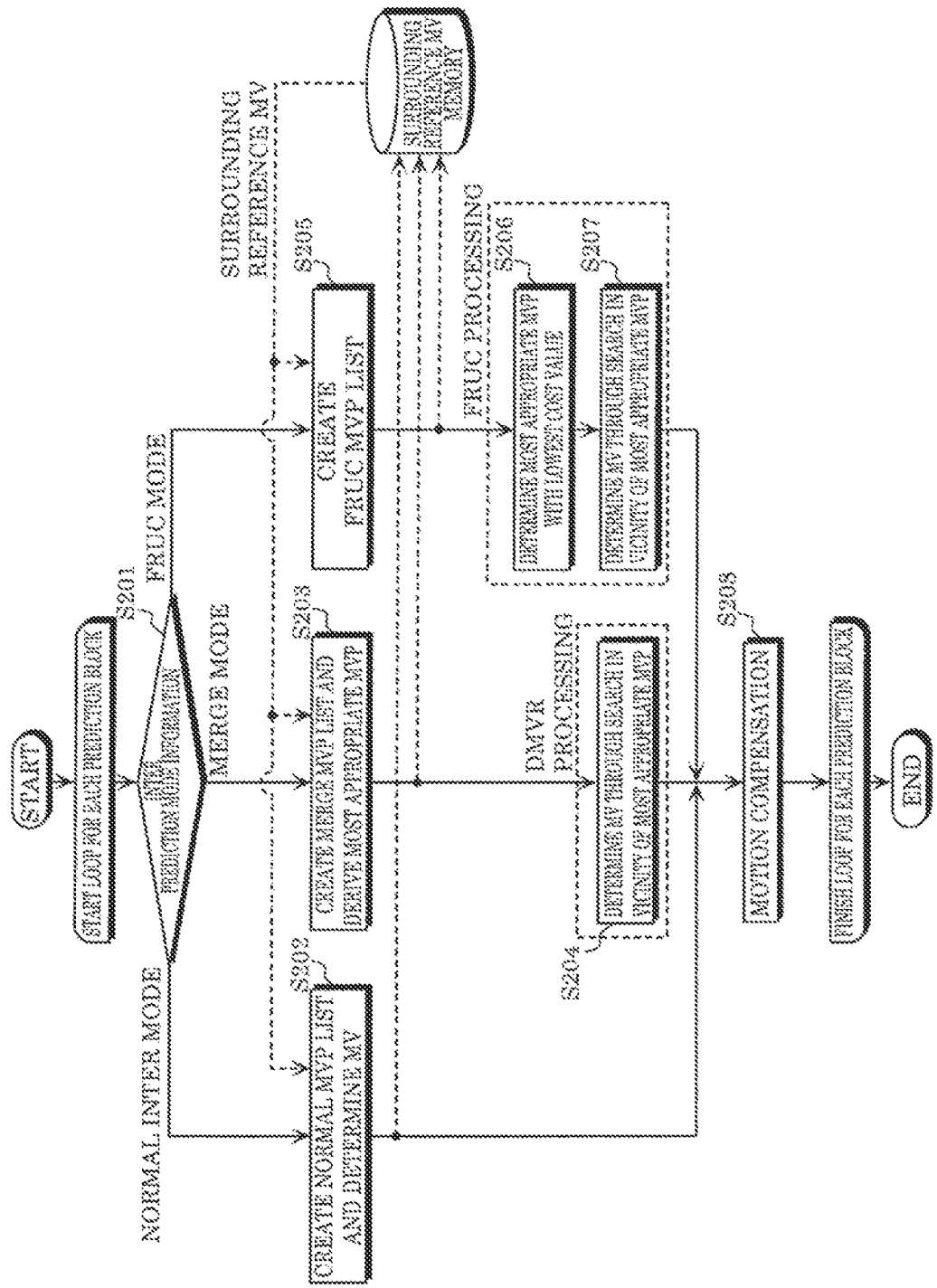
FIG. 17 is a flow chart of inter prediction processing in the second example of the pipeline configuration according to Embodiment 1.

FIG. 17 is a flow chart of inter prediction processing in the second example of the outline of the pipeline configuration described with reference to FIG. 15. The processing illustrated in FIG. 17 is repeatedly performed for each prediction block, which is the processing unit of inter-frame prediction processing. The processing illustrated in FIG. 17 is performed by encoder 100 and decoder 200. Although the following mainly describes the operations of inter predictor 126 included in encoder 100, the same applies to the operations of inter predictor 218 included in decoder 200.

The processing illustrated in FIG. 17 is different from the processing according to the first example described with reference to FIG. 14 in the following aspect: In the processing illustrated in FIG. 17, what is stored in the surrounding reference motion vector memory is not the final motion vector derived using each method. Rather, a temporary motion vector derived using one or more MVPs obtained using each method is stored in the surrounding reference motion vector memory.

With this, the surrounding reference motion vector used for deriving one or more MVPs in the processing on a subsequent block can be fed back at an early point in time in the processing flow. Therefore, as described with reference to FIG. 16, it is more likely to be able to significantly reduce the waiting time to wait for the next stage in the pipeline control.

The temporary motion vector stored in the surrounding reference motion vector memory is derived as follows:

(1) In the normal inter mode, inter predictor 126 determines, as the temporary motion vector, the final motion vector obtained through the normal motion vector derivation processing.

(2) In the merge mode, inter predictor 126 determines, as the temporary motion vector, the MVP (the most appropriate MVP) specified with a merge index among the plurality of MVPs indicated on the merge MVP list.

(3) In the FRUC mode, inter predictor 126 derives the temporary motion vector using the plurality of MVPs indicated on the FRUC MVP list by one of the following methods, for example: Inter predictor 126 determines, as the temporary motion vector, an MVP registered at the top of the FRUC MVP list. Alternatively, inter predictor 126 scales down each of the plurality of MVPs indicated on the FRUC MVP list to the time interval of the temporally closest reference picture. Inter predictor 126 calculates, for each of the L0 direction and the L1 direction, the average or median of the plurality of MVPs obtained by the scaling, and determines the calculated motion vector as the temporary motion vector.

Note that inter predictor 126 may exclude, from the plurality of MVPs indicated on the FRUC MVP list, one or more MVPs registered with reference to the temporary motion vector, and may derive a temporary motion vector by carrying out one of the above-described methods on the remaining MVPs.

Although, in FIG. 17, the temporary motion vectors stored in the surrounding reference motion vector memory are each used as the surrounding reference motion vector for deriving one or more MVPs, the temporary motion vectors each may be used as the surrounding reference motion vector in other processing such as loop filtering. Note that in other processing such as loop filtering, the final motion vector used for motion compensation may be used, rather than the temporary motion vector. Specifically, the final motion vector is derived in the third stage illustrated in FIG. 15. Thus, the final motion vector may be used in the processing of the fourth and subsequent stages.

In the configuration illustrated in FIG. 15, that is, the pipeline configuration assuming this processing flow, the temporary motion vector is fed back as the surrounding reference motion vector at timing immediately after the MVP derivation processing; however, the temporary motion vector may be fed back at different timing, so long as the same information as the temporary motion vector described herein can be obtained.

Note that this processing flow is a mere example; a part of the processing described may be removed, or processing not described may be added. For example, in the merge mode, the temporary motion vector may be the same as the final motion vector in the case where the search in the vicinity of the most appropriate MVP is not performed.

Moreover, the processing flow described herein is basically common to encoder 100 and decoder 200; the only difference is whether the signal necessary for the processing is encoded into a stream or parsed from a stream.

Advantageous Effects of Second Example of Inter Prediction Processing

With the configuration described with reference to FIG. 15 through FIG. 17, the surrounding reference motion vector used for deriving one or more MVPs in the processing on a subsequent block can be fed back at an early point in time in the processing flow. Accordingly, it is possible to significantly reduce the waiting time, which occurs in the first example, to wait for the next stage in the pipeline control. With this, even a decoder with low processing performance is more likely to be able to complete the processing on all the blocks within the processing duration allocated to one picture.

Third Example of Inter Prediction Processing

Figure 18:
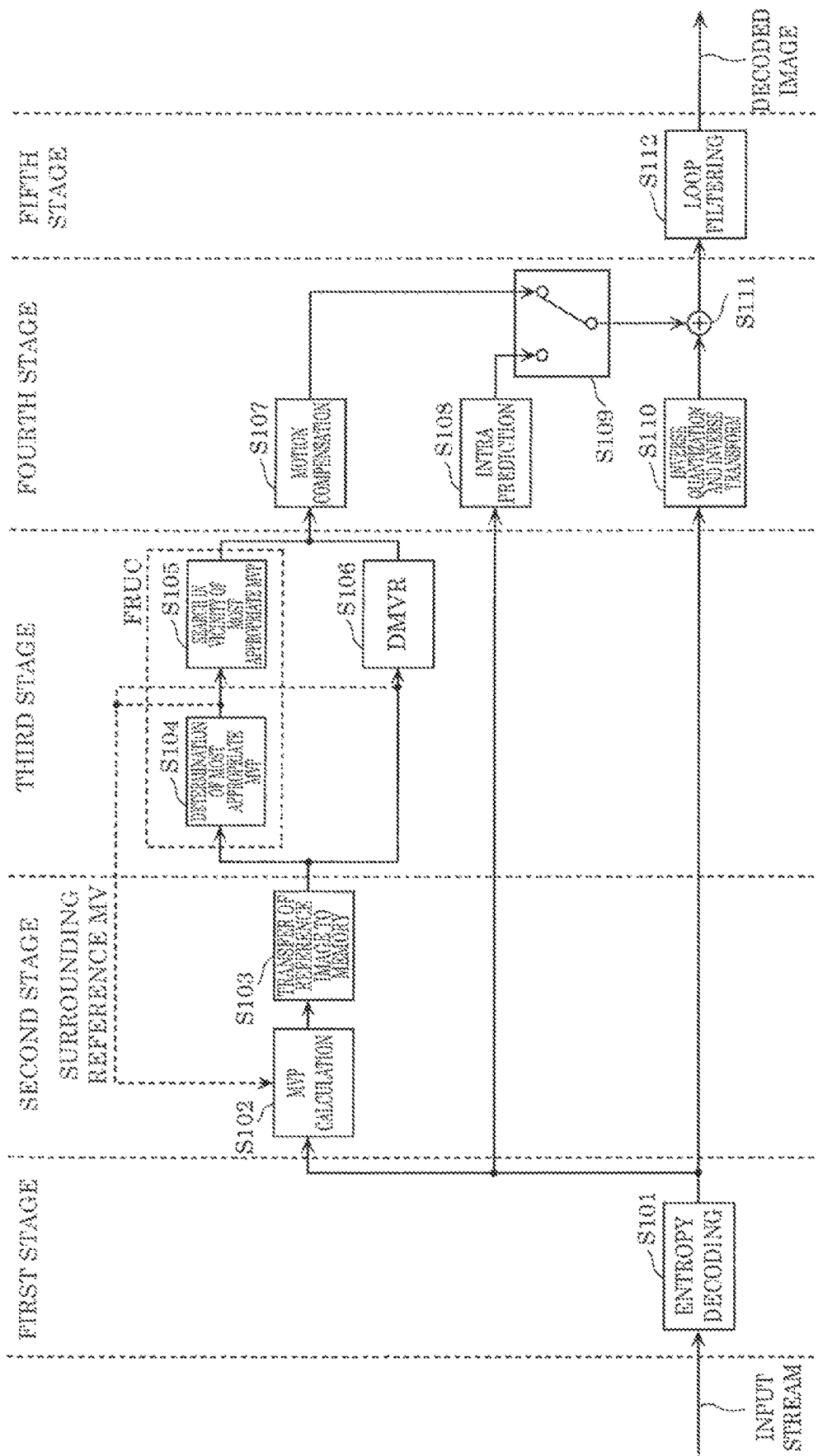
FIG. 18 is a schematic diagram illustrating a third example of the pipeline configuration according to Embodiment 1.

FIG. 18 is a diagram illustrating a third example of the outline of the pipeline configuration used for decoder 200. The third example illustrated in FIG. 18 is different from the first example illustrated in FIG. 11 in that decoder 200 uses, as the surrounding reference motion vector of a neighboring decoded block to be used for the MVP derivation in the inter prediction processing: the temporary motion vector available before the search in the vicinity of the most appropriate MVP is performed when the inter prediction mode is the FRUC mode; and the temporary motion vector available before the DMVR processing is performed when the inter prediction mode is the merge mode, rather than the final motion vector obtained by performing all the processing related to the motion vector derivation.

In such a manner, the length of the feedback loop becomes relatively short by using the temporary motion vector as the surrounding reference motion vector for deriving one or more MVPs in the decoding processing on a subsequent block. This makes it possible to feed back the surrounding reference motion vector at an early point in time in the third stage. Accordingly, if the MVP derivation processing for the subsequent block can start after the temporary motion vector is determined, the second stage, which is one long stage in the first example, can be divided into two shorter stages, namely the second stage and the third stage.

Note that this outline of the pipeline configuration is a mere example; a part of the processing described may be removed, processing not described may be added, or the boundaries of the stages may be modified.

Figure 19:
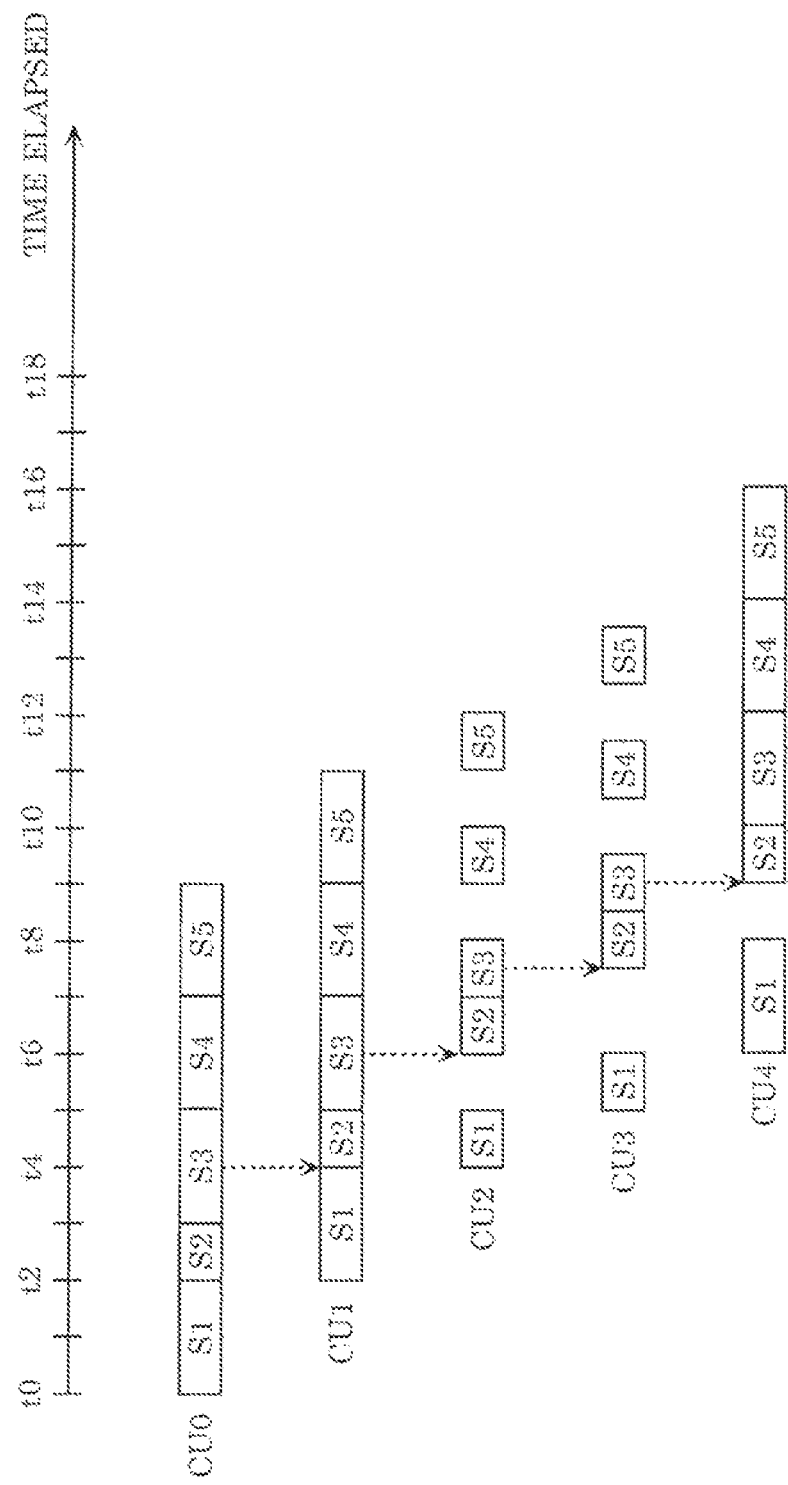
FIG. 19 is a timing diagram illustrating an example of processing timing in the third example of the pipeline configuration according to Embodiment 1.

FIG. 19 illustrates, in time series, processing timing of the respective stages for each block to be decoded, in the third example of the outline of the pipeline configuration described with reference to FIG. 18.

As in FIG. 13, FIG. 19 illustrates the processing timing for five blocks to be decoded, namely, coding units CU0 through CU4 illustrated in the block partition example in FIG. 12. In the first example, the second stage is one long stage, whereas in the third example, the second stage is divided into two shorter stages, namely the second stage and the third stage. Here, the second stage is shorter than the other stages. This is because the processing in the second stage only includes the MVP derivation and the memory transfer of the reference image, and thus involves a small amount of processing. Note that there is an assumption here that the speed of the memory transfer of the reference image is sufficiently fast.

The processing of each stage starts after the processing of the same stage for the block immediately before the current block in the processing order is finished. However, the third example is an exceptional case where the second stage starts after the temporary motion vector is determined in the third stage for the block immediately before the current block in the processing order. Thus, for example, the processing of the second stage for coding unit CU1 starts at time t4 at which the first half of the processing in the third stage for coding unit CU0 is finished. At this time, since the processing duration of the second stage for coding unit CU0 is sufficiently short as compared to the processing durations of the other stages, the processing of the second stage for coding unit CU1 can start with no waiting time after the processing of the first stage for coding unit CU1 is finished.

On the other hand, for example, although the processing of the second stage for coding unit CU3 starts after the first half of the processing of the third stage for coding unit CU2 is finished, the processing duration of the second stage for coding unit CU2 is not sufficiently short as compared to the processing durations of the other stages, and thus, there is a slight increase in the waiting time.

As a result, as compared to the second example described with reference to FIG. 16, there is waiting time from time t8 to time t9 between the first stage and the second stage when coding unit CU4 is processed. However, as compared to the first example described with reference to FIG. 13, the waiting time is significantly reduced, and even with the waiting time, the processing duration required for completing the decoding processing for one picture is about the same as the processing duration originally intended. Therefore, it is more likely to be able to complete the processing on all the blocks within the processing duration allocated to one picture.

Figure 20:
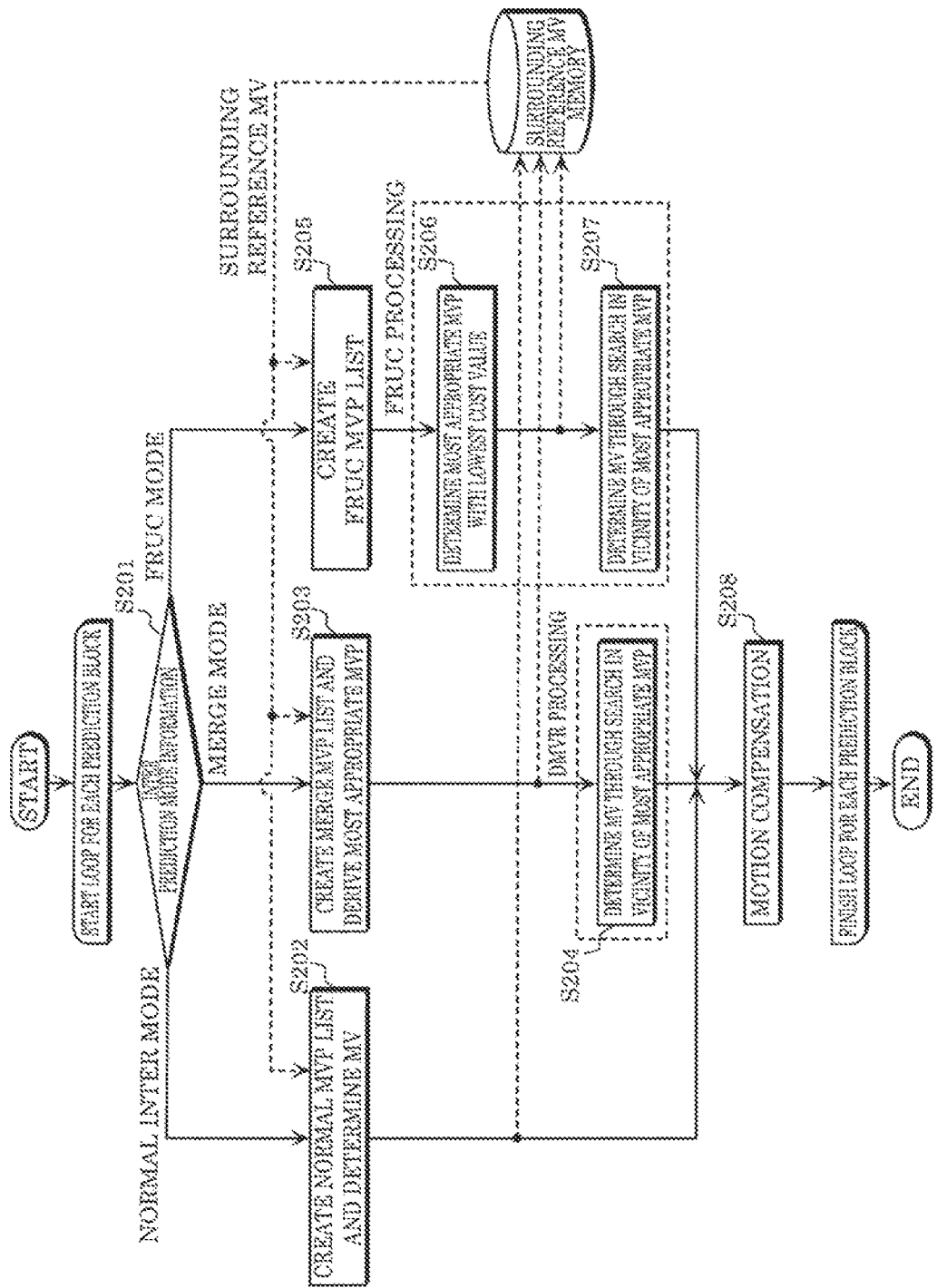
FIG. 20 is a flow chart of inter prediction processing in the third example of the pipeline configuration according to Embodiment 1.

FIG. 20 is a flow chart of inter prediction processing in the third example of the outline of the pipeline configuration described with reference to FIG. 18. The processing illustrated in FIG. 20 is repeatedly performed for each prediction block, which is the processing unit of inter-frame prediction processing. The processing illustrated in FIG. 20 is performed by encoder 100 and decoder 200. Although the following mainly describes the operations of inter predictor 126 included in encoder 100, the same applies to the operations of inter predictor 218 included in decoder 200.

The processing illustrated in FIG. 20 is different from the processing according to the first example described with reference to FIG. 14 in the following aspect: In the processing illustrated in FIG. 20, the final motion vector derived using each method is not used as the surrounding reference motion vector. Rather, the temporary motion vector which is a value available in the middle of the motion vector derivation processing performed using each method is used as the surrounding reference motion vector and stored in the surrounding reference motion vector memory.

With this, the surrounding reference motion vector used for deriving one or more MVPs in the processing on a subsequent block can be fed back at an early point in time in the processing flow. Therefore, as described with reference to FIG. 19, it is more likely to be able to significantly reduce the waiting time to wait for the next stage in the pipeline control.

The temporary motion vector stored in the surrounding reference motion vector memory is derived as follows:
  (1) In the normal inter mode, inter predictor 126 determines, as the temporary motion vector, the final motion vector obtained through the normal motion vector derivation processing.
  (2) In the merge mode, inter predictor 126 determines, as the temporary motion vector, the MVP (the most appropriate MVP) specified with a merge index among the plurality of MVPs indicated on the merge MVP list.
  (3) In the FRUC mode, inter predictor 126 determines, as the temporary motion vector, the MVP (the most appropriate MVP) which is determined to make the cost value lowest among the plurality of MVPs indicated on the FRUC MVP list, using the bilateral matching method or the template matching method.

Although, in FIG. 20, the temporary motion vectors stored in the surrounding reference motion vector memory are each used as the surrounding reference motion vector for deriving one or more MVPs, the temporary motion vectors each may be used as the surrounding reference motion vector in other processing such as loop filtering. Note that in other processing such as loop filtering, the final motion vector used for motion compensation may be used, rather than the temporary motion vector. Specifically, the final motion vector is derived in the third stage illustrated in FIG. 18. Thus, the final motion vector may be used in the processing of the fourth and subsequent stages.

In the configuration illustrated in FIG. 18, that is, the pipeline configuration assuming this processing flow, the temporary motion vector is fed back as the surrounding reference motion vector at timing immediately before the search in the vicinity of the most appropriate MVP and the DMVR processing; however, the temporary motion vector may be fed back at different timing, so long as the same information as the temporary motion vector described herein can be obtained.

Note that this processing flow is a mere example; a part of the processing described may be removed, or processing not described may be added. For example, in the merge mode or the FRUC mode, the temporary motion vector may be the same as the final motion vector in the case where the search in the vicinity of the most appropriate MVP is not performed.

Moreover, the processing flow described herein is basically common to encoder 100 and decoder 200; the only difference is whether the signal necessary for the processing is encoded into a stream or parsed from a stream.

Advantageous Effects of Third Example of Inter Prediction Processing

With the configuration described with reference to FIG. 18 through FIG. 20, the surrounding reference motion vector used for deriving one or more MVPs in the processing on a subsequent block can be fed back at an early point in time in the processing flow. Accordingly, it is possible to significantly reduce the waiting time, which occurs in the first example, to wait for the next stage in the pipeline control. With this, even a decoder with low processing performance is more likely to be able to complete the processing on all the blocks within the processing duration allocated to one picture.

As compared to the second example described with reference to FIG. 17, the motion vector obtained through the processing up to the most appropriate MVP determination processing can be used as the surrounding reference motion vector when the inter prediction mode is the FRUC mode. Thus, since it is possible to refer to a more reliable motion vector, it is more likely to be able to improve the coding efficiency.

[Surrounding Reference Motion Vector Combining Final Motion Vector and Temporary Motion Vector]

In addition to storing the temporary motion vector in the surrounding reference motion vector memory according to the second example described with reference to FIG. 17 and the third example described with reference to FIG. 20, the final motion vector may also be stored as in the first example described with reference to FIG. 14.

By doing so, in the MVP derivation processing for a subsequent block, inter predictor 126 can obtain, as the surrounding reference motion vector, the final motion vector from, among a plurality of surrounding reference blocks, a block from which the final motion vector can be obtained, whereas inter predictor 126 can obtain, as the surrounding reference motion vector, the temporary motion vector from, among the plurality of surrounding reference blocks, a block from which the final motion vector cannot be obtained.

Figure 21:
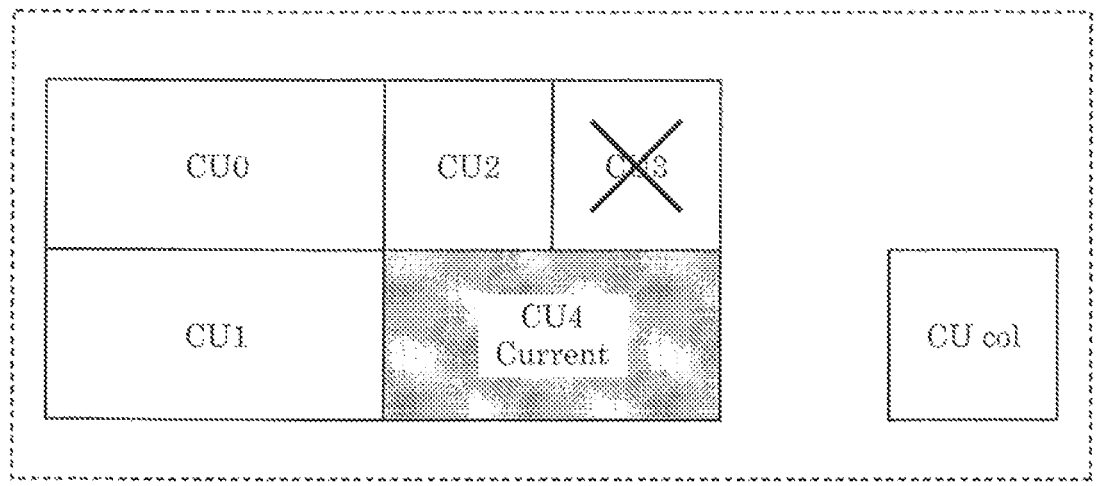
FIG. 21 is a diagram illustrating a motion vector referred to according to Embodiment 1.
Figure 22:
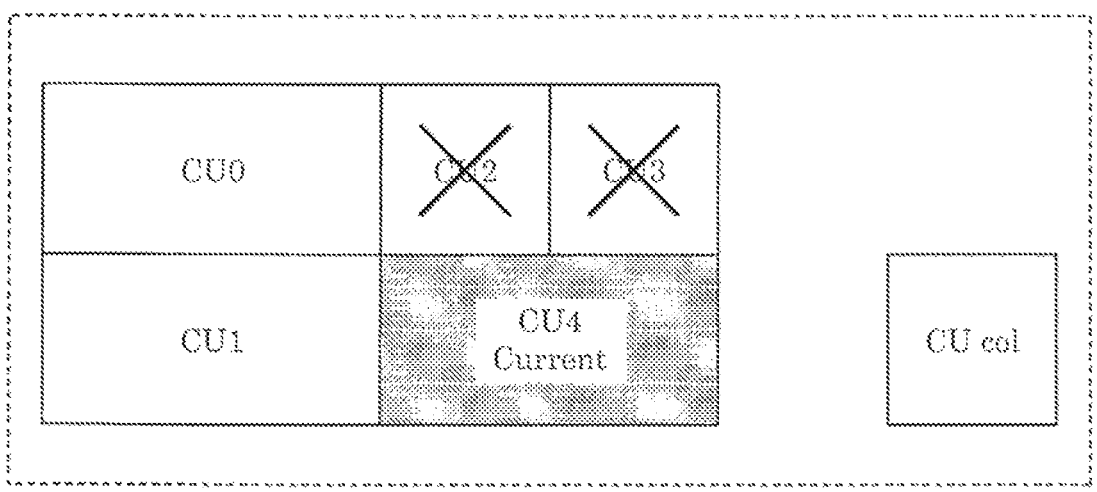
FIG. 22 is a diagram illustrating a motion vector referred to according to Embodiment 1.

FIG. 21 and FIG. 22 are diagrams illustrating neighboring blocks referred to for deriving one or more MVPs for the current block. Coding unit CU4 is the current block, coding units CU0 through CU3 are spatially neighboring blocks on which the processing has already been completed, and coding unit CU col is a temporally neighboring block which is collocated in another picture on which the processing has already been completed.

FIG. 21 is a diagram illustrating the case where the final motion vector cannot be obtained from a block which is immediately before the current block in the processing order. In this example, inter predictor 126 obtains a temporary motion vector as the surrounding reference motion vector from coding unit CU3 (first processed block), and obtains final motion vectors as the surrounding reference motion vectors from the other blocks (third processed block). Note that coding unit CU col is a block included in a picture on which the processing has already been completed. Therefore, inter predictor 126 obtains a final motion vector as the surrounding reference motion vector from coding unit CU col.

FIG. 22 is a diagram illustrating the case where final motion vectors cannot be obtained from two blocks which are immediately before the current block in the processing order. In this example, inter predictor 126 obtains temporary motion vectors as the surrounding reference motion vectors from coding units CU2 and CU3 (first processed block, second processed block), and inter predictor 126 obtains final motion vectors as the surrounding reference motion vectors from the other blocks (third processed block). Note that coding unit CU col is a block included in a picture on which the processing has already been completed. Therefore, inter predictor 126 obtains a final motion vector as the surrounding reference motion vector from coding unit CU col.

As described above, by obtaining final motion vectors as the surrounding reference motion vectors from, among surrounding reference blocks, the blocks from which final motion vectors can be obtained, inter predictor 126 can perform the MVP derivation with reference to motion vectors that are more reliable compared to the case of obtaining temporary motion vectors from all the blocks as the surrounding reference motion vectors. This makes it more likely to be able to improve the coding efficiency.

Note that inter predictor 126 may switch referable motion vectors depending on whether the boundary of the current block is the boundary of the CTU. For example, when the current block is not adjacent to the upper boundary of the CTU, inter predictor 126 determines whether to refer to a final motion vector or a temporary motion vector of a block adjacent to the upper end of the current block, using such methods as those described with reference to FIG. 21 and FIG. 22. On the other hand, when the current block is adjacent to the upper boundary of the CTU, inter predictor 126 constantly refers to a final motion vector because the derivation of the final motion vector has been completed for the block adjacent to the upper end of the current block. In the same manner, when the current block is adjacent to the left boundary of the CTU, inter predictor 126 constantly refers to a final motion vector of a block adjacent to the left end of the current block.

Combination of First, Second, and Third Examples

A processing flow combining the first example described with reference to FIG. 14, the second example described with reference to FIG. 17, and the third example described with reference to FIG. 20 may be used.

One specific example is that when the inter prediction mode is the merge mode, inter predictor 126 may use the final motion vector as the surrounding reference motion vector as in the first example, whereas when the inter prediction mode is the FRUC mode, inter predictor 126 may use, as the surrounding reference motion vector, a temporary motion vector available before the search in the vicinity of the most appropriate MVP is performed as in the third example. Since the merge mode processing involves a less amount of processing compared to the FRUC mode processing, processing for a subsequent block can be completed within the processing duration in which the processing is required to be completed, even if a final motion vector is fed back as the surrounding reference motion vector after being finalized. As such, there is a possibility of being able to perform the processing without accumulation of the waiting time to wait for the next stage in the pipeline control. Moreover, by making a more reliable motion vector available as the surrounding reference motion vector in the case of the merge mode, the coding efficiency is more likely to improve.

[Switching According to Low Delay Mode Signal]

Inter predictor 126 may determine whether or not to process a current stream in a low delay mode, and when determining to process the current stream in the low delay mode, inter predictor 126 may refer to the temporary motion vector as the surrounding reference motion vector for the MVP derivation processing as described in the second example or the third example. On the other hand, when determining not to process the current stream in the low delay mode, inter predictor 126 may refer to the final motion vector as the surrounding reference motion vector for the MVP derivation processing as described in the first example.

By doing so, the length of the feedback loop for the surrounding reference motion vector is shortened in the low delay mode, and thus the waiting time to wait for the next stage in the pipeline control is more likely to be reduced significantly. On the other hand, when the mode is not the low delay mode, there is waiting time to wait for the next stage in the pipeline control, but the coding efficiency is more likely to improve because a highly reliable motion vector can be referred to as the surrounding reference motion vector.

Encoder 100 generates information indicating whether or not to perform processing in the low delay mode, and encodes the generated information into a stream. Decoder 200 obtains the information by parsing the information from the stream, and determines whether or not to perform processing in the low delay mode based on the information obtained. Note that the information is described in a sequence header region, a picture header region, a slice header region, or an auxiliary information region of the current stream.

For example, encoder 100 may switch whether or not to perform processing in the low delay mode, according to the size of a current picture to be encoded. For example, when the picture size is small, the number of blocks to be processed is small, meaning that there is sufficient time to process the blocks, and therefore, encoder 100 is not set to the low delay mode, whereas when the picture size is large, the number of blocks to be processed is large, meaning that there is not sufficient time to process the blocks, and therefore, encoder 100 is set to the low delay mode.

Encoder 100 may switch whether or not to perform processing in the low delay mode, according to the processing capability of decoder 200 to which the stream is to be transmitted. For example, when the processing capability of decoder 200 is high, encoder 100 is not set to the low delay mode because decoder 200 is capable of performing a lot of processing within a certain processing duration. On the other hand, when the processing capability of decoder 200 is low, encoder 100 is set to the low delay mode because decoder 200 is not capable of performing a lot of processing within a certain processing duration.

Encoder 100 may switch whether or not to perform processing in the low delay mode, according to a profile or level information assigned to the current stream. For example, encoder 100 is not set to the low delay mode when the profile or the level assigned to the stream assume a decoder having sufficient processing capability. On the other hand, encoder 100 is set to the low delay mode when the profile or the level assigned to the stream assume a decoder having insufficient processing capability.

Note that the information which indicates whether or not to perform processing in the low delay mode and is encoded into the stream need not be a signal directly indicating whether or not to perform processing in the low delay mode, and may be a signal having a different meaning. For example, the information indicating whether or not to perform processing in the low delay mode may be directly associated with the profile and the level, so that whether or not to perform processing in the low delay mode can be determined based only on the signal indicating the profile and the level.

As described above, encoder 100 according to the present embodiment: when encoding a current block in an inter prediction mode in which decoder 200 performs motion estimation (for example, merge mode or FRUC mode in S201 in FIG. 17), derives a first motion vector of the current block (S203 or S205); stores, in memory, the first motion vector derived; derives a second motion vector of the current block (S204 or S207); and generates a prediction image of the current block by performing motion compensation using the second motion vector (S208). In deriving the first motion vector (S203 or S205), encoder 100 derives the first motion vector of the current block using a first motion vector of a processed block.

Accordingly, decoder 200 can start deriving the first motion vector of the current block, for example after the first motion vector of a neighboring block is derived in the pipeline control, without waiting for completion of the derivation of the second motion vector of the neighboring block. Thus, since the waiting time that occurs in the pipeline control performed by decoder 200 can be reduced as compared to the case of deriving the first motion vector using the second motion vector of the neighboring block, it is possible to reduce processing delay.

For example, in deriving the first motion vector, encoder 100 (*i*) generates a motion vector predictor list indicating a plurality of motion vector predictors using the first motion vector of the processed block, and (ii) determines the first motion vector of the current block from the plurality of motion vector predictors indicated on the motion vector predictor list (for example, S203 or S205 in FIG. 17).

For example, the inter prediction mode in which decoder 200 performs motion estimation is a merge mode, and in deriving the second motion vector, encoder 100 derives the second motion vector by performing motion estimation in the vicinity of the first motion vector (for example, S204 in FIG. 17).

For example, the inter prediction mode in which decoder 200 performs motion estimation is a frame rate up-conversion (FRUC) mode, and in deriving the second motion vector, encoder 100 derives the second motion vector by performing motion estimation in the vicinity of the first motion vector (for example, S207 in FIG. 20).

For example, the inter prediction mode in which decoder 200 performs motion estimation is a frame rate up-conversion (FRUC) mode, and in deriving the second motion vector, encoder 100 (*i*) determines a third motion vector (most appropriate MVP) from the plurality of motion vector predictors indicated on the motion vector predictor list (for example, S206 in FIG. 17), and (ii) derives the second motion vector by performing motion estimation in the vicinity of the third motion vector (for example, S207 in FIG. 17).

For example, in determining the first motion vector (for example, S205 in FIG. 17), encoder 100 derives the first motion vector based on, for each of prediction directions, an average or a median of the plurality of motion vector predictors indicated on the motion vector predictor list.

For example, in determining the first motion vector (for example, S205 in FIG. 17), among the plurality of motion vector predictors indicated on the motion vector predictor list, encoder 100 determines, as the first motion vector, a motion vector predictor indicated at the top of the motion vector predictor list.

For example, in generating the motion vector predictor list (for example, S203 or S205 in FIG. 17), encoder 100 derives each of the plurality of motion vector predictors using the first motion vector of the processed block or a second motion vector of the processed block. In determining the first motion vector (for example, S205 in FIG. 17), encoder 100 determines the first motion vector from, among the plurality of motion vector predictors indicated on the motion vector predictor list, one or more motion vector predictor candidates derived using the second motion vector of the processed block. Accordingly, since the first motion vector can be determined using the reliable second motion vector, it is possible to suppress a decline in the reliability of the first motion vector.

For example, in generating the motion vector predictor list (for example, S203 or S205 in FIG. 17), encoder 100 derives a motion vector predictor using the first motion vector of the processed block when the processed block is included in a picture including the current block, and encoder 100 derives a motion vector predictor using a second motion vector of the processed block when the processed block is included in a picture different from the picture including the current block. Accordingly, when the processed block is included in a picture different from the picture including the current block, encoder 100 uses the second motion vector, and as a result, the reliability of the motion vector predictor can be improved.

For example, in generating the motion vector predictor list (for example, S203 or S205 in FIG. 17), encoder 100 determines whether to use the first motion vector of the processed block or a second motion vector of the processed block to perform motion vector predictor derivation, according to the position of the processed block relative to the current block.

For example, in generating the motion vector predictor list (for example, S203 or S205 in FIG. 17), encoder 100 derives a motion vector predictor using the second motion vector of the processed block when the processed block is included in a processing unit different from the processing unit (for example, CTU) which includes the current block.

For example, in generating the motion vector predictor list (for example, S203 or S205 in FIG. 17), encoder 100: derives the motion vector predictor from a first processed block among a plurality of processed blocks included in a picture including the current block using a first motion vector of the first processed block, the first processed block being N blocks before the current block in a processing order; derives the motion vector predictor from a second processed block among the plurality of processed blocks using a first motion vector of the second processed block, the second processed block being after the first processed block in the processing order; and derives the motion vector predictor from a third processed block among the plurality of processed blocks using a second motion vector of the third processed block, the third processed block being before the first processed block in the processing order.

Accordingly, encoder 100 uses the second motion vector of the third processed block which is before the first processed block in the processing order, and as a result, the reliability of the motion vector predictor can be improved.

For example, N is 1.

For example, the first motion vector is further used in other processing different from motion vector predictor derivation. The other processing is loop filtering, for example.

For example, the second motion vector is used in loop filtering.

For example, when encoding the current block in a low delay mode, encoder 100 derives the first motion vector of the current block using the first motion vector of the processed block.

Accordingly, encoder 100 can perform appropriate processing according to whether or not to use the low delay mode.

For example, encoder 100 encodes, into a sequence header region, a picture header region, a slice header region, or an auxiliary information region, information indicating whether to encode the current block in the low delay mode.

For example, encoder 100 switches whether to encode the current block in the low delay mode, according to the size of a current picture including the current block.

For example, encoder 100 switches whether to encode the current block in the low delay mode, according to the processing capability of the decoder.

For example, encoder 100 switches whether to encode the current block in the low delay mode, according to a profile or level information assigned to a current stream to be encoded.

Decoder 200 according to the present embodiment, when decoding a current block in an inter prediction mode in which decoder 200 performs motion estimation (for example, merge mode or FRUC mode in S201 in FIG. 17): derives a first motion vector of the current block (S203 or S205); stores, in memory, the first motion vector derived; derives a second motion vector of the current block (S204 or S207); and generates a prediction image of the current block by performing motion compensation using the second motion vector (S208). In deriving the first motion vector (S203 or S205), decoder 200 derives the first motion vector of the current block using a first motion vector of a processed block.

Accordingly, decoder 200 can start deriving the first motion vector of the current block, for example after the first motion vector of a neighboring block is derived in the pipeline control, without waiting for completion of the derivation of the second motion vector of the neighboring block. Thus, since the waiting time that occurs in the pipeline control performed by decoder 200 can be reduced as compared to the case of deriving the first motion vector using the second motion vector of the neighboring block, it is possible to reduce processing delay.

For example, in deriving the first motion vector, decoder 200 (i) generates a motion vector predictor list indicating a plurality of motion vector predictors using the first motion vector of the processed block, and (ii) determines the first motion vector of the current block from the plurality of motion vector predictors indicated on the motion vector predictor list (for example, S203 or S205 in FIG. 17).

For example, the inter prediction mode in which decoder 200 performs motion estimation is a merge mode, and in deriving the second motion vector, decoder 200 derives the second motion vector by performing motion estimation in the vicinity of the first motion vector (for example, S204 in FIG. 17).

For example, the inter prediction mode in which decoder 200 performs motion estimation is a frame rate up-conversion (FRUC) mode, and in deriving the second motion vector, decoder 200 derives the second motion vector by performing motion estimation in the vicinity of the first motion vector (for example, S207 in FIG. 20).

For example, the inter prediction mode in which decoder 200 performs motion estimation is a frame rate up-conversion (FRUC) mode, and in deriving the second motion vector, decoder 200 (i) determines a third motion vector (most appropriate MVP) from the plurality of motion vector predictors indicated on the motion vector predictor list (for example, S206 in FIG. 17), and (ii) derives the second motion vector by performing motion estimation in the vicinity of the third motion vector (for example, S207 in FIG. 17).

For example, in determining the first motion vector (for example, S205 in FIG. 17), decoder 200 derives the first motion vector based on, for each of prediction directions, an average or a median of the plurality of motion vector predictors indicated on the motion vector predictor list.

For example, in determining the first motion vector (for example, S205 in FIG. 17), among the plurality of motion vector predictors indicated on the motion vector predictor list, decoder 200 determines, as the first motion vector, a motion vector predictor indicated at the top of the motion vector predictor list.

For example, in generating the motion vector predictor list (for example, S203 or S205 in FIG. 17), decoder 200 derives each of the plurality of motion vector predictors using the first motion vector of the processed block or a second motion vector of the processed block. In determining the first motion vector (for example, S205 in FIG. 17), decoder 200 determines the first motion vector from, among the plurality of motion vector predictors indicated on the motion vector predictor list, one or more motion vector predictor candidates derived using the second motion vector the processed block. Accordingly, since the first motion vector can be determined using the reliable second motion vector, it is possible to suppress a decline in the reliability of the first motion vector.

For example, in generating the motion vector predictor list (for example, S203 or S205 in FIG. 17), decoder 200 derives a motion vector predictor using the first motion vector of the processed block when the processed block is included in a picture including the current block, and decoder 200 derives a motion vector predictor using the second motion vector of the processed block when the processed block is included in a picture different from the picture including the current block. Accordingly, when the processed block is included in a picture different from the picture including the current block, decoder 200 uses the second motion vector, and as a result, the reliability of the motion vector predictor can be improved.

For example, in generating the motion vector predictor list (for example, S203 or S205 in FIG. 17), decoder 200 determines whether to use the first motion vector of the processed block or a second motion vector of the processed block to perform motion vector predictor derivation, according to the position of the processed block relative to the current block.

For example, in generating the motion vector predictor list (for example, S203 or S205 in FIG. 17), decoder 200 derives a motion vector predictor using the second motion vector of the processed block when the processed block is included in a processing unit different from the processing unit (for example, CTU) which includes the current block.

For example, in generating the motion vector predictor list (for example, S203 or S205 in FIG. 17), decoder 200: derives the motion vector predictor from a first processed block among a plurality of processed blocks included in a picture including the current block using a first motion vector of the first processed block, the first processed block being N blocks before the current block in a processing order; derives the motion vector predictor from a second processed block among the plurality of processed blocks using a first motion vector of the second processed block, the second processed block being after the first processed block in the processing order; and derives the motion vector predictor from a third processed block among the plurality of processed blocks using a second motion vector of the third processed block, the third processed block being before the first processed block in the processing order.

Accordingly, decoder 200 uses the second motion vector of the third processed block which is before the first processed block in the processing order, and as a result, the reliability of the motion vector predictor can be improved.

For example, N is 1.

For example, the first motion vector is further used in other processing different from motion vector predictor derivation. The other processing is loop filtering, for example.

For example, the second motion vector is used in loop filtering.

For example, when decoding the current block in a low delay mode, decoder 200 derives the first motion vector of the current block using the first motion vector of the processed block.

Accordingly, decoder 200 can perform appropriate processing according to whether or not to use the low delay mode.

For example, decoder 200 parses, from a sequence header region, a picture header region, a slice header region, or an auxiliary information region, information indicating whether to decode the current block in the low delay mode, and determines whether to decode the current block in the low delay mode based on the information.

For example, as illustrated in FIG. 15, a pipeline configuration of decoder 200 includes: a first stage in which the first motion vector of the current block is derived (second stage in FIG. 15); and a second stage which is different from the first stage and in which the second motion vector of the current block is derived (third stage in FIG. 15). Decoder 200 starts processing of the first stage for the current block when processing of the first stage for a block immediately before the current block in a processing order is completed, without waiting for completion of processing of the second stage for a block which is M blocks before the current block in the processing order.

For example, as illustrated in FIG. 18, a pipeline configuration of decoder 200 includes: a first stage in which the first motion vector of the current block is derived (second stage in FIG. 18); and a second stage which is different from the first stage and in which the second motion vector of the current block is derived (third stage in FIG. 18). Decoder 200 starts processing of the first stage for the current block when a first motion vector of a block which is M blocks before the current block in a processing order is derived, without waiting for completion of processing of the second stage for the block which is M blocks before the current block in the processing order.

For example, M is 1.

Encoder 100 according to the present embodiment includes: splitter 102 which splits a first image into a plurality of blocks; intra predictor 124 which predicts a block included in the first image using a reference block included in the first image; inter predictor 126 which predicts a block included in the first image using a reference block included in a second image different from the first image; loop filter 120 which applies a filter to blocks included in the first image; transformer 106 which transforms, into transform coefficients, prediction errors between an original signal and a prediction signal generated by intra predictor 124 or inter predictor 126; quantizer 108 which quantizes the transform coefficients to generate quantized transform coefficients; and entropy encoder 110 which generates an encoded bitstream by variable length encoding the quantized coefficients. When encoding a current block in an inter prediction mode in which decoder 200 performs motion estimation (for example, merge mode or FRUC mode in S201 in FIG. 17), inter predictor 126: derives a first motion vector of the current block (S203 or S205); storing, in memory, the first motion vector derived; deriving a second motion vector of the current block (S204 or S207);

and generating a prediction image of the current block by performing motion compensation using the second motion vector (S208). In deriving the first motion vector, encoder 100 derives the first motion vector of the current block using a first motion vector of a processed block.

Decoder 200 according to the present embodiment includes: a decoder (entropy decoder 202) which decodes an encoded bitstream and outputs quantized coefficients; inverse quantizer 204 which inverse quantizes the quantized coefficients and outputs transform coefficients; inverse transformer 206 which inverse transforms the transform coefficients and outputs prediction errors; intra predictor 216 which predicts a block included in a first image using a reference block included in the first image; inter predictor 218 which predicts a block included in the first image using a reference block included in a second image different from the first image; and loop filter 212 which applies a filter to blocks included in the first image. When decoding a current block in an inter prediction mode in which decoder 200 performs motion estimation (for example, merge mode or FRUC mode in S201 in FIG. 17), inter predictor 218: derives a first motion vector of the current block (S203 or S205); stores, in memory, the first motion vector derived; derives a second motion vector of the current block (S204 or S207); and generates a prediction image of the current block by performing motion compensation using the second motion vector (S208). In deriving the first motion vector, decoder 200 derives the first motion vector of the current block using a first motion vector of a processed block.

Implementation Example of Encoder

Figure 23:
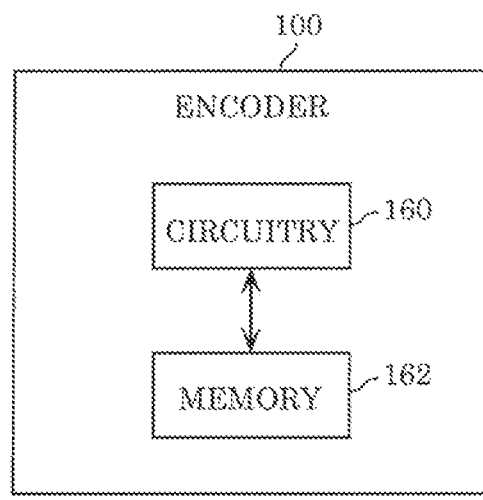
FIG. 23 is a block diagram illustrating an implementation example of an encoder.

FIG. 23 is a block diagram illustrating an implementation example of encoder 100 according to Embodiment 1. Encoder 100 includes circuitry 160 and memory 162. For example, the plurality of constituent elements of encoder 100 illustrated in FIG. 1 are implemented by circuitry 160 and memory 162 illustrated in FIG. 23.

Circuitry 160 is circuitry that performs information processing and is accessible to memory 162. For example, circuitry 160 is exclusive or general electronic circuitry which encodes a video. Circuitry 160 may be a processor such as a central processing unit (CPU). Circuitry 160 may be an aggregate of a plurality of electronic circuits. Moreover, for example, circuitry 160 may perform the functions of two or more constituent elements among the plurality of constituent elements of encoder 100 illustrated in FIG. 1 etc., excluding the constituent elements that store information.

Memory 162 is exclusive or general memory for storing information used by circuitry 160 to encode a video. Memory 162 may be electronic circuitry, and may be connected to circuitry 160. Memory 162 may be included in circuitry 160. Memory 162 may be an aggregate of a plurality of electronic circuits. Memory 162 may be a magnetic disc, an optical disc, or the like, or may be expressed as storage, a recording medium, or the like. Memory 162 may be non-volatile memory or may be volatile memory.

For example, memory 162 may store a video to be encoded, or may store a bitstream corresponding to an encoded video. Memory 162 may store a program for causing circuitry 160 to encode a video.

For example, memory 162 may perform the functions of, among the plurality of constituent elements of encoder 100 illustrated in FIG. 1 etc., the constituent elements that store information. Specifically, memory 162 may perform the functions of block memory 118 and frame memory 122 illustrated in FIG. 1. More specifically, memory 162 may store a reconstructed block and a reconstructed picture, for example.

Note that not all of the plurality of constituent elements illustrated in FIG. 1 etc. need to be implemented by encoder 100, and not all of the processes described above need to be performed by encoder 100. Some of the constituent elements illustrated in FIG. 1 etc. may be included in another device, and some of the processes described above may be performed by another device. Motion compensation is efficiently performed by encoder 100 implementing some of the constituent elements illustrated in FIG. 1 etc. and performing some of the processes described above.

Implementation Example of Decoder

Figure 24:
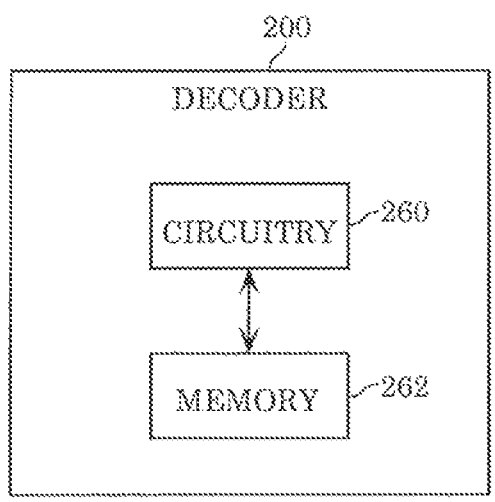
FIG. 24 is a block diagram illustrating an implementation example of a decoder.

FIG. 24 is a block diagram illustrating an implementation example of decoder 200 according to Embodiment 1. Decoder 200 includes circuitry 260 and memory 262. For example, the plurality of constituent elements of decoder 200 illustrated in FIG. 10 are implemented by circuitry 260 and memory 262 illustrated in FIG. 24.

Circuitry 260 is circuitry that performs information processing and is accessible to memory 262. For example, circuitry 260 is exclusive or general electronic circuitry which decodes a video. Circuitry 260 may be a processor such as a CPU. Circuitry 260 may be an aggregate of a plurality of electronic circuits. Moreover, for example, circuitry 260 may perform the functions of two or more constituent elements among the plurality of constituent elements of decoder 200 illustrated in FIG. 10 etc., excluding the constituent elements that store information.

Memory 262 is exclusive or general memory for storing information used by circuitry 260 to decode a video. Memory 262 may be electronic circuitry, and may be connected to circuitry 260. Memory 262 may be included in circuitry 260. Memory 262 may be an aggregate of a plurality of electronic circuits. Memory 262 may be a magnetic disc, an optical disc, or the like, or may be expressed as storage, a recording medium, or the like. Memory 262 may be non-volatile memory or may be volatile memory.

For example, memory 262 may store a bitstream corresponding to an encoded video, or may store a video corresponding to a decoded bitstream. Memory 262 may store a program for causing circuitry 260 to decode a video.

For example, memory 262 may perform the functions of, among the plurality of constituent elements of decoder 200 illustrated in FIG. 10 etc., the constituent elements that store information. Specifically, memory 262 may perform the functions of block memory 210 and frame memory 214 illustrated in FIG. 10. More specifically, memory 262 may store a reconstructed block and a reconstructed picture, for example.

Note that not all of the plurality of constituent elements illustrated in FIG. 10 etc. need to be implemented by decoder 200, and not all of the processes described above need to be performed by decoder 200. Some of the constituent elements illustrated in FIG. 10 etc. may be included in another device, and some of the processes described above may be performed by another device. Motion compensation is efficiently performed by decoder 200 implementing some of the constituent elements illustrated in FIG. 10 etc. and performing some of the processes described above.

[Supplemental Information]

Encoder 100 and decoder 200 according to the present embodiment may be used as an image encoder and an image decoder, respectively, or may be used as a video encoder and a video decoder, respectively. Alternatively, encoder 100 and decoder 200 can each be used as an inter prediction device (an inter-frame prediction device).

That is to say, encoder 100 and decoder 200 may correspond only to inter predictor (inter-frame predictor) 126 and inter predictor (inter-frame predictor) 218, respectively. The other constituent elements such as transformer 106 and inverse transformer 206 may be included in another device.

In the present embodiment, each of the constituent elements may be configured in the form of an exclusive hardware product, or may be implemented by executing a software program suitable for the constituent element. Each of the constituent elements may be implemented by means of a program execution unit, such as a CPU or a processor, reading and executing a software program recorded on a recording medium such as a hard disk or a semiconductor memory.

Specifically, encoder 100 and decoder 200 may each include processing circuitry and storage electrically connected to the processing circuitry and accessible from the processing circuitry. For example, the processing circuitry corresponds to circuitry 160 or 260, and the storage corresponds to memory 162 or 262.

The processing circuitry includes at least one of an exclusive hardware product or a program execution unit, and performs processing using the storage. When the processing circuitry includes a program execution unit, the storage stores a software program executed by the program execution unit.

Here, the software for implementing, for example, encoder 100 or decoder 200 according to the present embodiment is a program as follows:

The constituent elements may be circuits as described above. The circuits may constitute one circuit as a whole, or may be individual circuits. Each constituent element may be implemented by a general processor, or may be implemented by an exclusive processor.

Moreover, processing executed by a particular constituent element may be executed by another constituent element. The processing execution order may be modified, or a plurality of processes may be executed in parallel. Furthermore, an encoding and decoding device may include encoder 100 and decoder 200.

Although some aspects of encoder 100 and decoder 200 have been described above based on an embodiment, the aspects of encoder 100 and decoder 200 are not limited to this embodiment. Various modifications to this embodiment that are conceivable to those skilled in the art, as well as embodiments resulting from combinations of constituent elements in different embodiments, may be included within the scope of the aspects of encoder 100 and decoder 200, so long as they do not depart from the essence of the present disclosure.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 2

As described in the above embodiment and variations, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in the above embodiment and variations may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiment and variations; various modifications may be made to the exemplary embodiment and variations, the results of which are also included within the scope of the embodiment and variations of the present disclosure.

Next, application examples of the moving picture encoding method (image encoding method) and the moving picture decoding method (image decoding method) described in the above embodiment and variations and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 25:
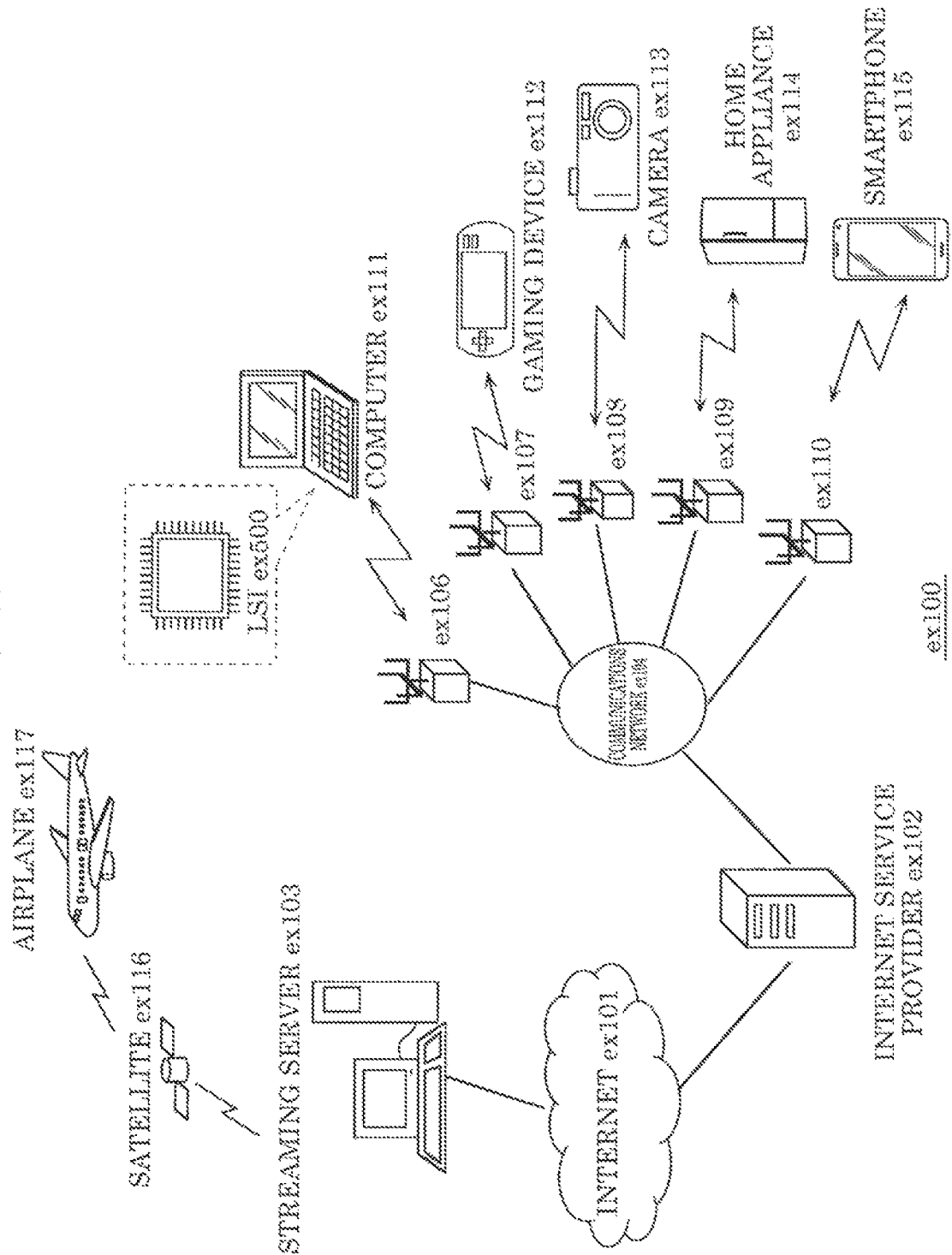
FIG. 25 illustrates an overall configuration of a content providing system for implementing a content distribution service.

FIG. 25 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiment and variations on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 26:
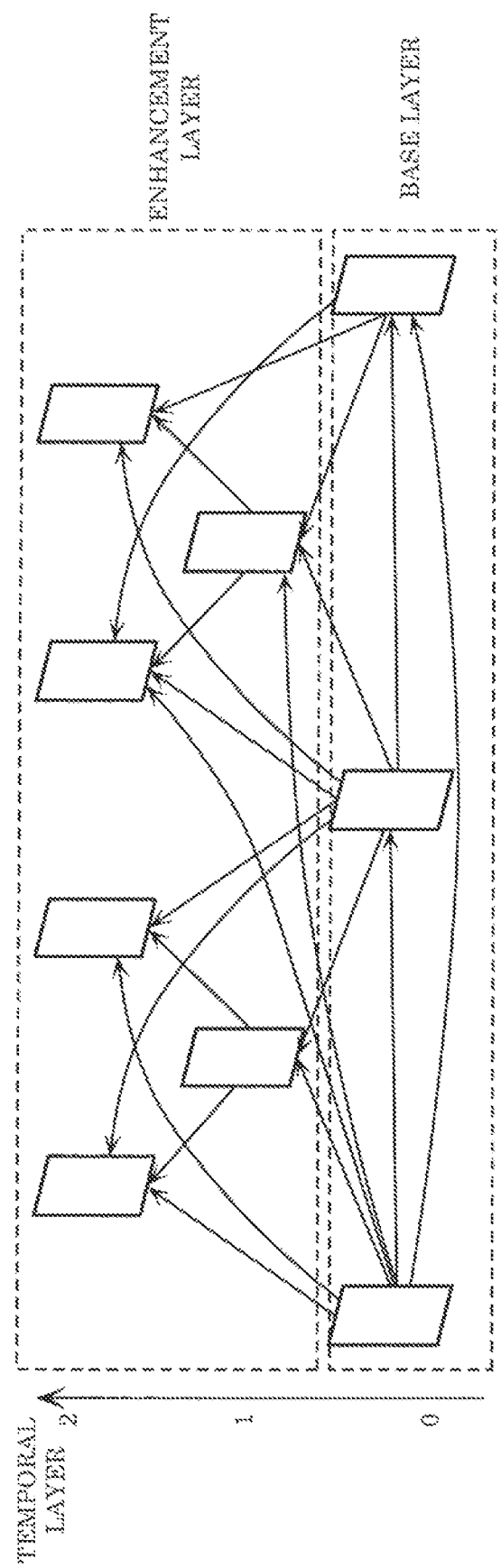
FIG. 26 illustrates one example of an encoding structure in scalable encoding.

The switching of content will be described with reference to a scalable stream, illustrated in FIG. 26, that is compression coded via implementation of the moving picture encoding method described in the above embodiment and variations. The server may have a configuration in which content is switched while making use of the temporal and/or spatial scalability of a stream, which is achieved by division into and encoding of layers, as illustrated in FIG. 26. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 27:
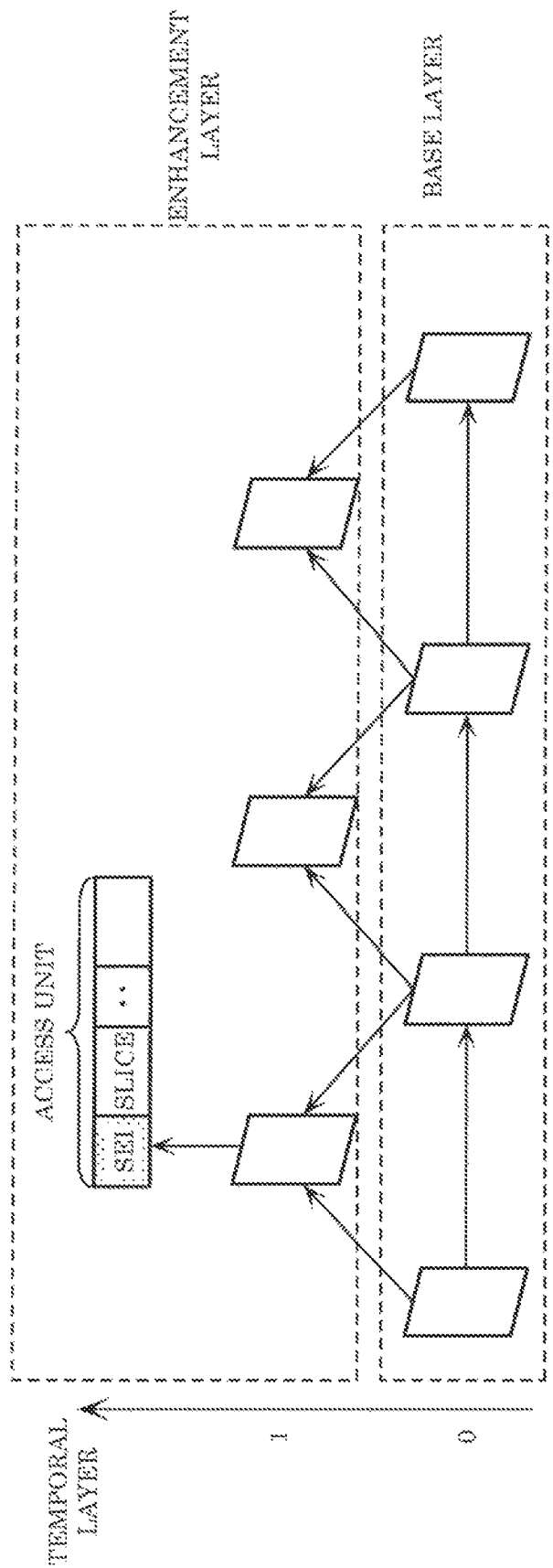
FIG. 27 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 27, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 28:
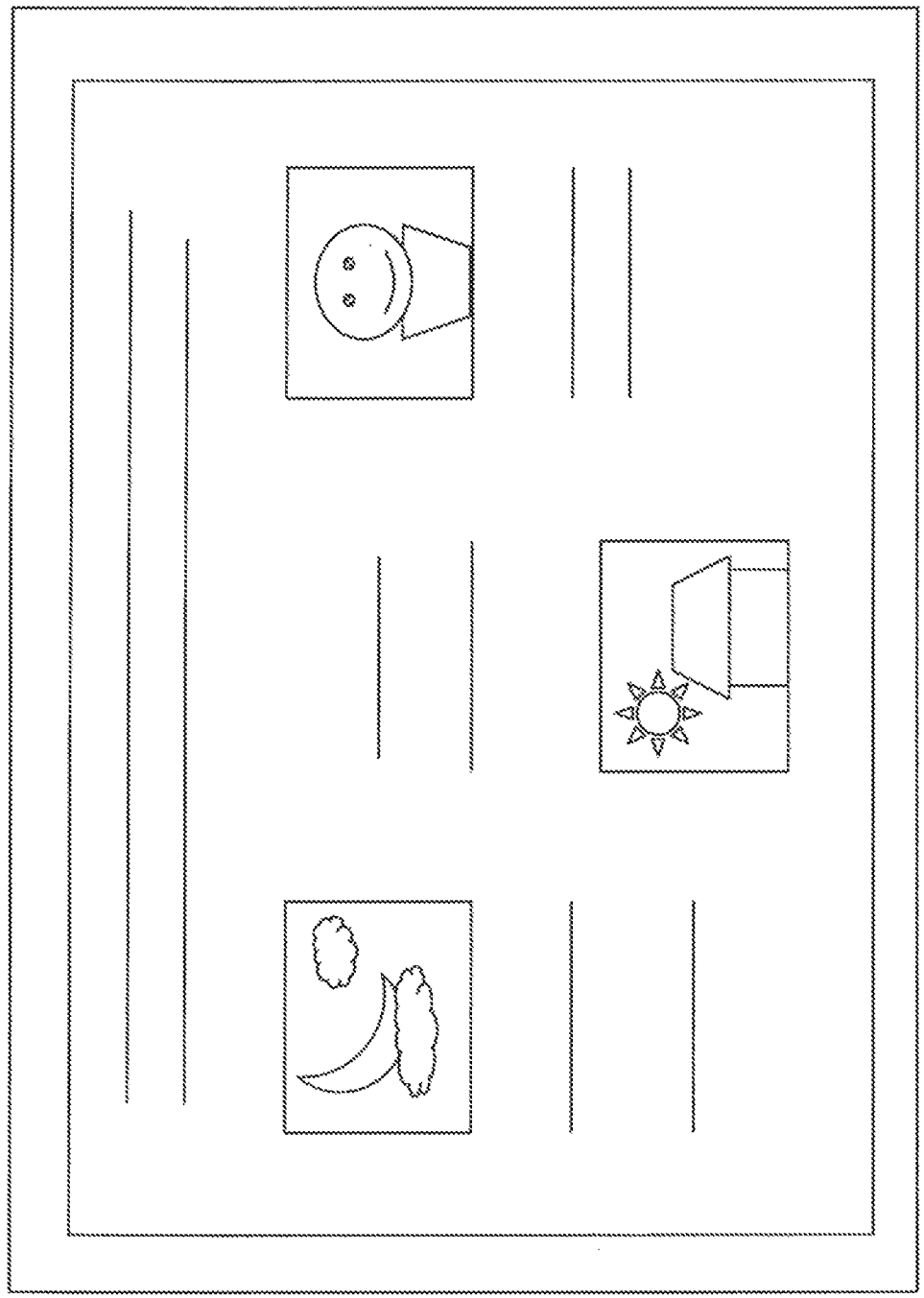
FIG. 28 illustrates an example of a display screen of a web page.
Figure 29:
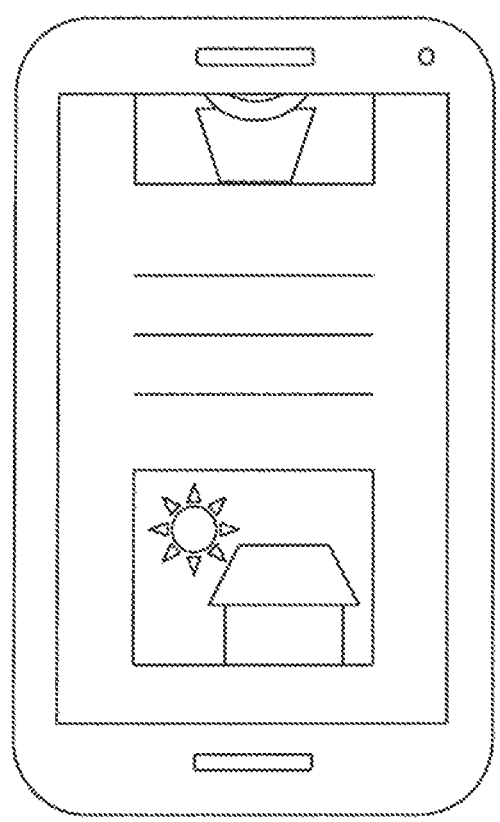
FIG. 29 illustrates an example of a display screen of a web page.

FIG. 28 illustrates an example of a display screen of a web page on, for example, computer ex111. FIG. 29 illustrates an example of a display screen of a web page on, for example, smartphone ex115. As illustrated in FIG. 28 and FIG. 29, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiment and variations may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 30:
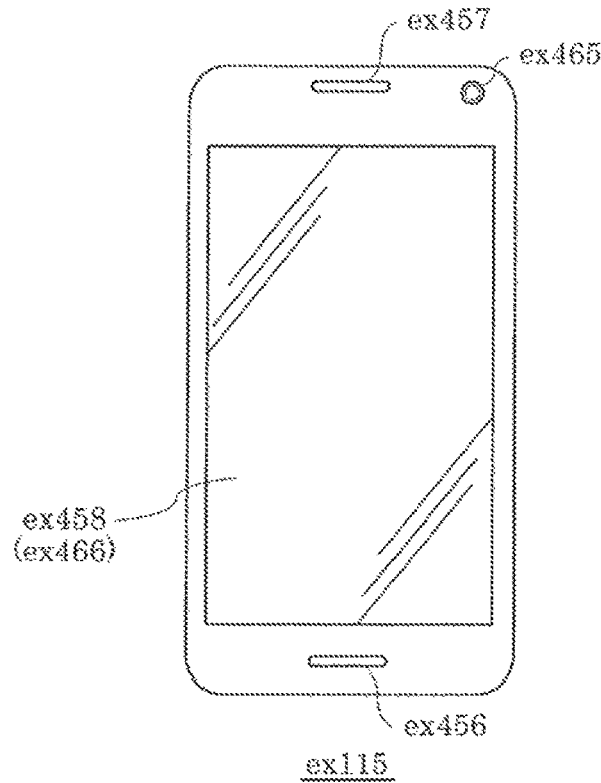
FIG. 30 illustrates one example of a smartphone.
Figure 31:
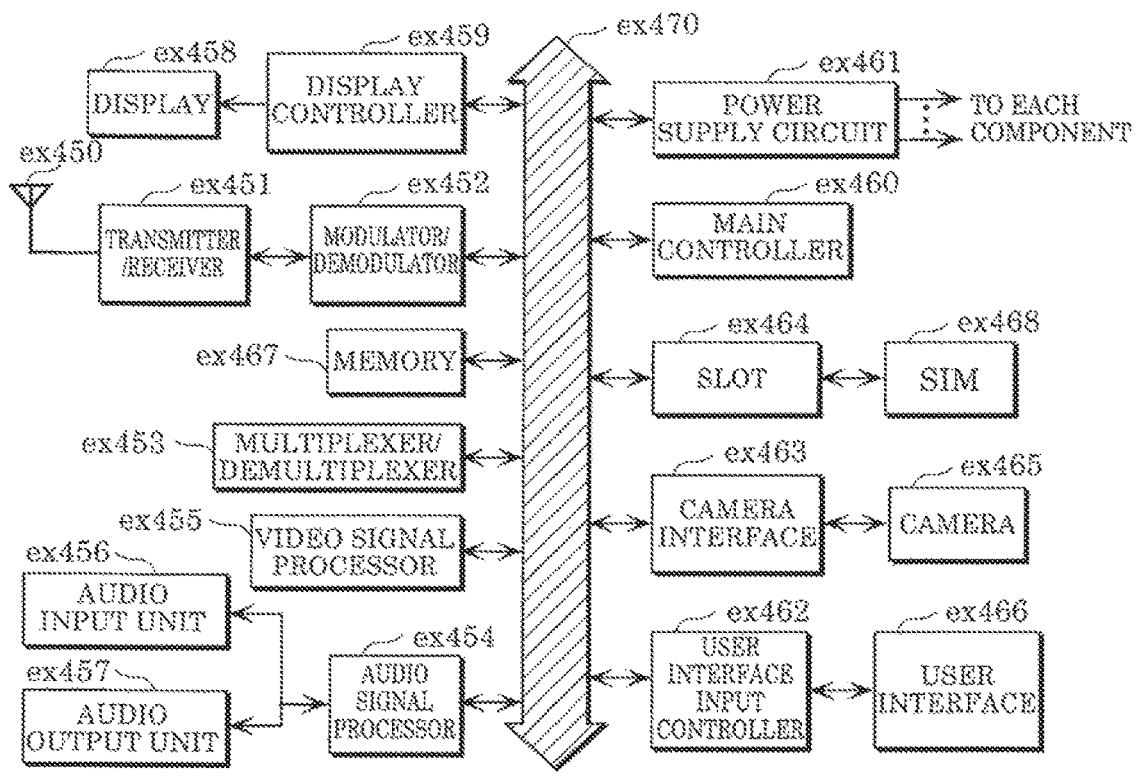
FIG. 31 is a block diagram illustrating a configuration example of a smartphone.

FIG. 30 illustrates smartphone ex115. FIG. 31 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiment and variations, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiment and variations, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. A decoding method, comprising:
deriving a first motion vector of a first current block to be processed, using a motion vector of a previous block which has been previously processed;
deriving a second motion vector of the first current block by performing motion estimation in vicinity of a position specified by the first motion vector;
generating a prediction image of the first current block by performing motion compensation using the second motion vector;
deriving a third motion vector of a second current block to be processed after the first current block, using the first motion vector of the first current block, when the second current block is included in a first picture including the first current block;
deriving a third motion vector of the second current block, using the second motion vector of the first current block, when the second current block is included in a second picture different from the first picture;
deriving a fourth motion vector of the second current block by performing motion estimation in vicinity of a position specified by the third motion vector; and
generating a prediction image of the second current block by performing motion compensation using the fourth motion vector,
wherein the deriving the third motion vector includes:
(i) generating a motion vector predictor list indicating a plurality of motion vector predictors using the first motion vector or the second motion vector of the first current block; and
(ii) determining the third motion vector of the second current block based on the plurality of motion vector predictors.

2. An encoder, comprising:
circuitry; and
memory,
wherein, using the memory, the circuitry, in inter prediction processing:
derives a first motion vector of a first current block to be processed, using a motion vector of a previous block which has been previously processed;
derives a second motion vector of the first current block by performing motion estimation in vicinity of a position specified by the first motion vector;
generates a prediction image of the first current block by performing motion compensation using the second motion vector;
derives a third motion vector of a second current block to be processed after the first current block, using the first motion vector of the first current block, when the second current block is included in a first picture including the first current block;
derives a third motion vector of the second current block, using the second motion vector of the first current block, when the second current block is included in a second picture different from the first picture;
derives a fourth motion vector of the second current block by performing motion estimation in vicinity of a position specified by the third motion vector; and
generates a prediction image of the second current block by performing motion compensation using the fourth motion vector, and
wherein in deriving the third motion vector, the circuitry:
(i) generates a motion vector predictor list indicating a plurality of motion vector predictors using the first motion vector or the second motion vector of the first current block; and
(ii) determines the third motion vector of the second current block based on the plurality of motion vector predictors.

* * * * *